United States Patent
Aoki et al.

(10) Patent No.: US 9,386,228 B2
(45) Date of Patent: Jul. 5, 2016

(54) IMAGE PROCESSING DEVICE, IMAGING DEVICE, IMAGE PROCESSING METHOD, AND NON-TRANSITORY COMPUTER-READABLE MEDIUM

(71) Applicant: FUJIFILM Corporation, Tokyo (JP)

(72) Inventors: Takashi Aoki, Saitama (JP); Tomoyuki Kawai, Saitama (JP); Takehiro Koguchi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/696,640

(22) Filed: Apr. 27, 2015

(65) Prior Publication Data

US 2015/0229847 A1 Aug. 13, 2015

Related U.S. Application Data

(63) Continuation of application No. PCT/JP2013/077918, filed on Oct. 15, 2013.

(30) Foreign Application Priority Data

Nov. 5, 2012 (JP) .................... 2012-243374

(51) Int. Cl.
*H04N 5/232* (2006.01)
*G02B 7/34* (2006.01)
(Continued)

(52) U.S. Cl.
CPC .............. *H04N 5/23293* (2013.01); *G02B 7/34* (2013.01); *G03B 13/36* (2013.01); *G03B 17/18* (2013.01);
(Continued)

(58) Field of Classification Search
CPC ................................. H04N 5/23293

USPC ...................................... 348/333.11
See application file for complete search history.

(56) References Cited

U.S. PATENT DOCUMENTS 8,045,047 B2 * 10/2011 Nikkanen .......... H04N 5/23212
348/222.1
8,717,478 B2 * 5/2014 Shiohara ............ H04N 5/23212
348/333.01

(Continued)

FOREIGN PATENT DOCUMENTS

JP 2002-131622 A 5/2002
JP 2004-40740 A 2/2004

(Continued)

OTHER PUBLICATIONS

International Search Report, issued in PCT/JP2013/077918, dated Jan. 21, 2014.

(Continued)

*Primary Examiner* — Roberto Velez
*Assistant Examiner* — Cynthia Segura
(74) *Attorney, Agent, or Firm* — Birch, Stewart, Kolasch & Birch, LLP

(57) ABSTRACT

An image processing device includes an image generation device, a first display device and a second display device, and a display control device, wherein the image generation device generates the first display image and the second display image such that the first display image and the second display image are different in at least any one of decimation ratio, enlargement ratio and reduction ratio of the first display image and the second display image, and the image generation device makes the first display device and the second display device different in at least any one of pixels that are of the first pixel group and the second pixel group and that are used in the generation of the second display image, the enlargement ratio and the reduction ratio of the second display image, and a pixel region in which the second display image is displayed.

19 Claims, 15 Drawing Sheets

(51) Int. Cl.
*G03B 13/36* (2006.01)
*G03B 17/18* (2006.01)
*H04N 9/04* (2006.01)
*G06T 3/40* (2006.01)
*H04N 5/369* (2011.01)

(52) U.S. Cl.
CPC .............. *G06T 3/4038* (2013.01); *G06T 3/4076* (2013.01); *H04N 5/23212* (2013.01); *H04N 5/3696* (2013.01); *H04N 9/045* (2013.01); *G06T 2200/28* (2013.01); *G06T 2200/32* (2013.01); *G06T 2207/30168* (2013.01)

(56) References Cited

U.S. PATENT DOCUMENTS

| | | | | |
|---|---|---|---|---|
| 8,848,090 | B2 * | 9/2014 | Koguchi | G03B 13/12 348/333.01 |
| 9,179,059 | B2 * | 11/2015 | Kawai | G02B 7/34 |
| 2005/0191047 | A1 | 9/2005 | Toji | |
| 2009/0153693 | A1 * | 6/2009 | Onuki | H04N 5/23212 348/222.1 |
| 2011/0157385 | A1 * | 6/2011 | Hoshino | G03B 3/00 348/208.99 |
| 2012/0087544 | A1 * | 4/2012 | Muramatsu | G03B 15/16 382/103 |
| 2012/0212661 | A1 | 8/2012 | Yamaguchi et al. | |
| 2015/0070539 | A1 * | 3/2015 | Kawai | G02B 7/34 348/280 |
| 2015/0304547 | A1 * | 10/2015 | Inoue | G02B 7/34 348/349 |
| 2015/0381883 | A1 * | 12/2015 | Kawai | H04N 5/23293 348/333.08 |

FOREIGN PATENT DOCUMENTS

| | | |
|---|---|---|
| JP | 2004-212891 A | 7/2004 |
| JP | 2009-232288 A | 10/2009 |
| JP | 2009-237214 A | 10/2009 |
| JP | 2012-113064 A | 6/2012 |
| JP | 2012-173531 A | 9/2012 |

OTHER PUBLICATIONS

Written Opinion of the International Searching Authority, issued in PCT/JP2013/077918, dated Jan. 21, 2014.

* cited by examiner

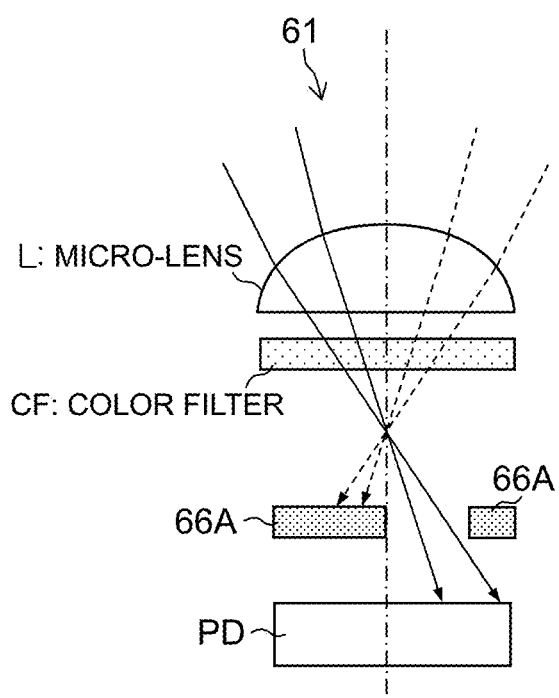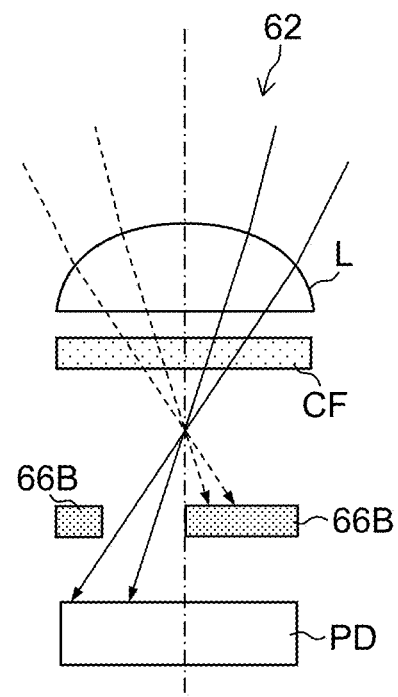

FIG.8A
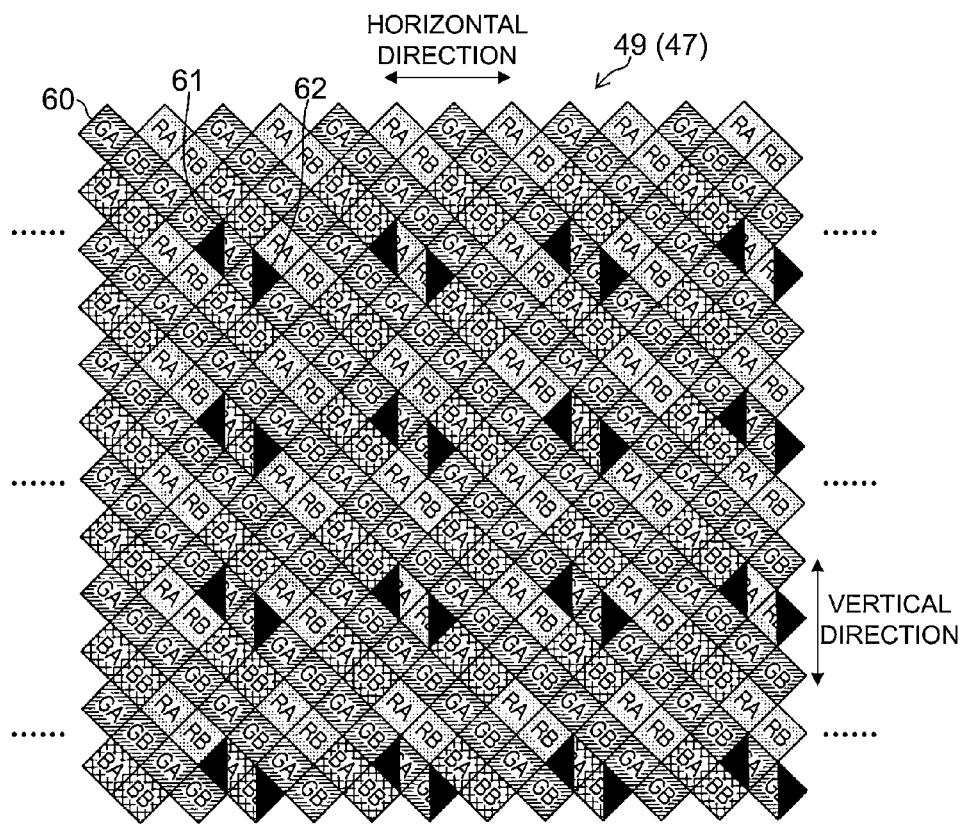
FIG.8B          FIG.8C
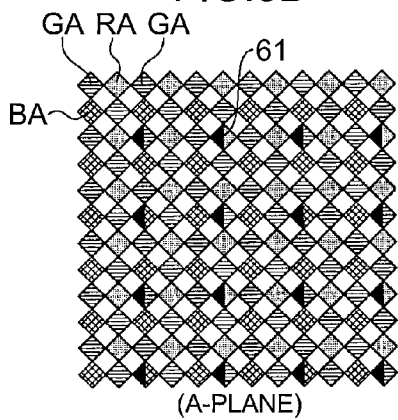   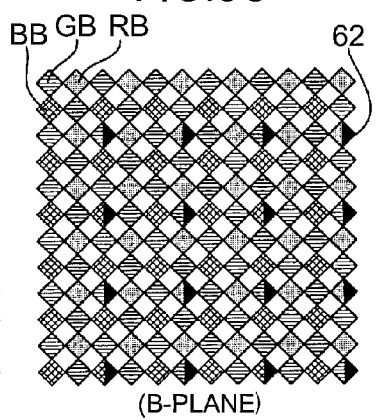
(A-PLANE)       (B-PLANE)

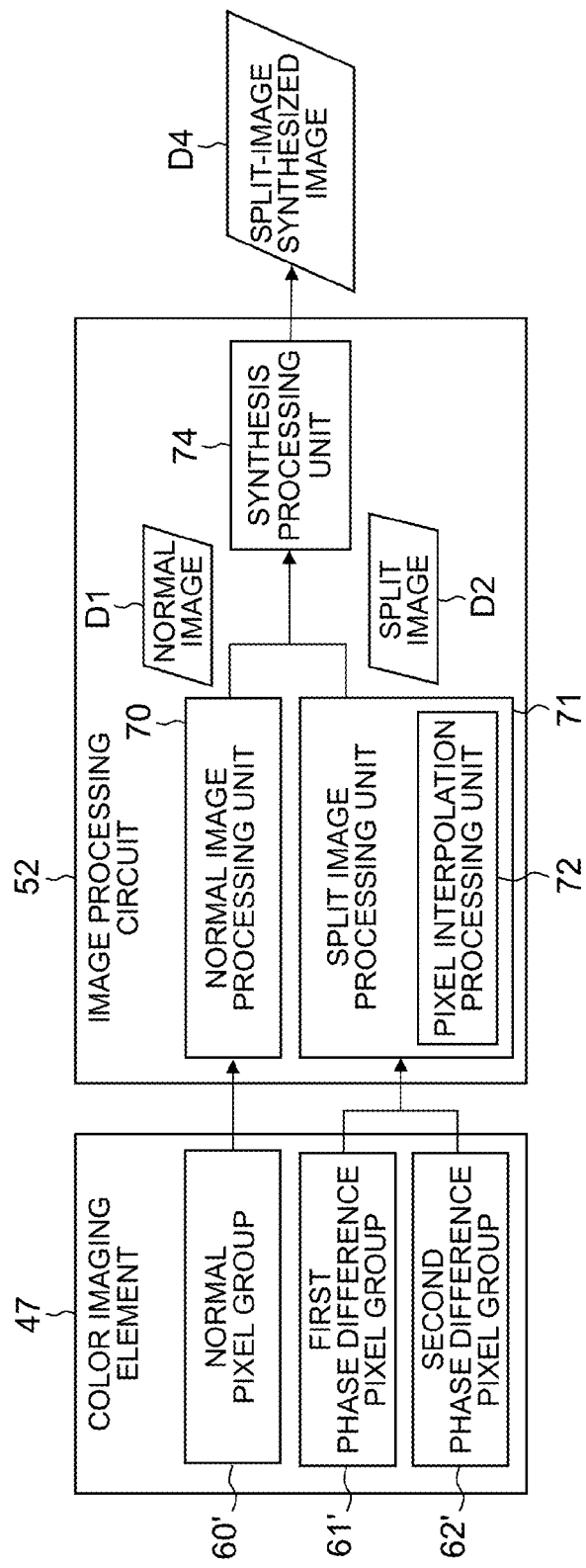

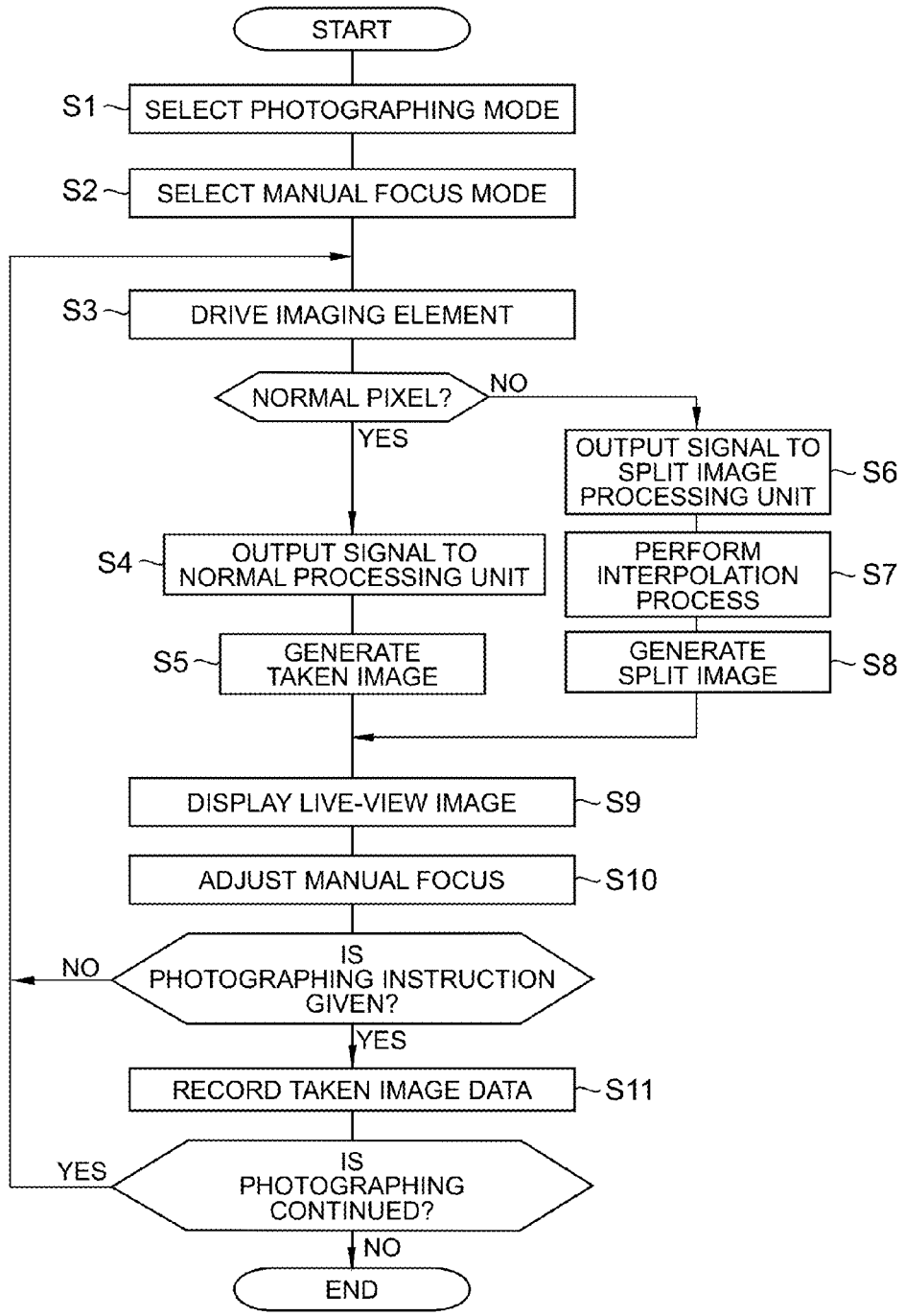

IMAGE PROCESSING DEVICE, IMAGING DEVICE, IMAGE PROCESSING METHOD, AND NON-TRANSITORY COMPUTER-READABLE MEDIUM

CROSS-REFERENCE TO RELATED APPLICATIONS

This application is a Continuation of PCT International Application No. PCT/JP2013/077918 filed on Oct 15, 2013, which claims priority under 35 U.S.C§119(a) to Japanese Patent Application No. 2012-243374 filed on Nov. 5, 2012. Each of the above application(s) is hereby expressly incorporated by reference, in its entirety, into the present application.

BACKGROUND OF THE INVENTION

1. Field of the Invention

The present invention relates to an image processing device, an imaging device, an image processing method and a non-transitory computer-readable medium having a program thereon, and particularly, relates to a method for displaying split images on a plurality of display devices.

2. Description of the Related Art

There is known a camera that has a manual focus scheme in which a user (photographer) manually performs focusing and an automatic focus scheme in which the focusing is automatically performed, as the focusing technique for the camera (imaging device), and that allows for the selection of the arbitrary scheme from both schemes.

In the manual focus, which requires a user to perform the focusing by visual observation, it is sometimes difficult to exactly perform the focusing by visual observation, depending on the property of an object image and the photographing situation. Therefore, as a technique for assisting the focusing at the time of the manual focus, there has been proposed a technique in which a so-called split image is displayed on display units (a viewfinder, a rear liquid crystal display and the like).

The split image is an image that is used for the focus check at the time of the manual focus, and for example, the split image can be composed by the juxtaposition of images that are obtained from two kinds of phase difference pixels. In such a split image, at a spot that is not in focus, the phases are shifted so that the images are displayed so as to be shifted, and at a spot that is in focus, the images are not shifted and are clearly displayed. A user can accurately perform the focusing, while checking the shift degree of the split image by visual observation.

As a device utilizing the split image, for example, Japanese Patent Application Laid-Open No. 2004-040740 (hereinafter referred to as PTL 1) discloses a manual focusing device to form a split image from two object images that are imaged at two distance measurement positions, respectively.

Further, Japanese Patent Application Laid-Open No. 2009-237214 (hereinafter referred to as PTL 2) discloses an imaging device to generate a split image corresponding to the phase difference between two optical images and to perform display switching over between the split image and a partial image on a display device at the time of the manual focus.

SUMMARY OF THE INVENTION

As described above, the split image for assisting the check of the focus state at the time of the manual focus is displayed on display units such as a viewfinder and a rear liquid crystal display. A user performs the focusing while checking the split image displayed on these display units.

Therefore, when the camera includes a plurality of display systems, it is preferable that the split image can be displayed on the respective display systems. For example, when a user looks into an EVF (electric viewfinder) and performs the focusing, it is preferable to display the split image on the EVF. On the other hand, when it is estimated that the user does not look into the EVF but performs the focusing through a rear liquid crystal display, it is preferable to display the split image on the rear liquid crystal display.

The plurality of display units do not always match in resolution property, and for example, the resolution of the EVF is often higher than the resolution of the rear liquid crystal display. When the resolutions of the plurality of display units are different, the camera has a poor usability unless the display units have a proper conformity in terms of the display (the size, the scaling ratio and the like) of the split image.

Particularly when the split image is created based on imaging signals from imaging pixels (phase difference pixels) to detect the phase difference, the phase difference pixels, compared to normal pixels, are fewer in the number of pixels, are limited in terms of the arrangement area on the imaging element, or are sparsely arranged. Therefore, when the phase difference pixels are utilized, from the standpoint of the improvement of the usability, it is preferable to optimize the display forms of the split images to be displayed on the respective display units, in consideration of the arrangement property of the phase difference pixels and the resolution of each display unit.

However, there is not found any conventional technical literature that discloses or proposes a technique for actualizing the optimized display of the split image on each of the plurality of display units.

For example, PTL 1 discloses that an output image from an image processing circuit and a split image output from a focus image output circuit are displayed on and output to a back monitor and a monitor in a finder, but does not disclose or suggest any specific display adjustment technique for the split image on each of the back monitor and the finder. For example, PTL 2 discloses that it is possible to alter the position and size of a split image to be displayed on a display unit 19 (a liquid crystal display or the like), but does not disclose or suggest any technique for adjusting the display of the split image among a plurality of display units.

The present invention, which has been made in view of the above circumstances, has an object to provide a technology for harmonizing the display of a split image (focus check image) among a plurality of display devices and improving the usability for a user.

An aspect of the present invention relates to an image processing device including: an image generation device configured to generate a first display image based on an image signal and generating a second display image from a first image and a second image, the image signal being output from an imaging element, the imaging element including a first pixel group and a second pixel group on which an object image passing through a first region and a second region of a photographing lens is pupil-divided and formed, respectively, the second display image being used for focus check, the first image and the second image being based on a first image signal and a second image signal that are output from the first pixel group and the second pixel group; a first display device and a second display device configured to display the first display image and the second display image; and a display control device configured to perform such a control that the first display image generated by the image generation device is displayed on at least one of the first display device and that the second display device and the second display image generated by the image generation device is displayed within a display region for the first display image, in which the image generation device generates the first display image and the second display image such that the first display image and the second display image are different in at least any one of decimation ratio, enlargement ratio and reduction ratio of the first display image and the second display image, and the image generation device makes the first display device and the second display device different in at least any one of pixels that are of the first pixel group and the second pixel group and that are used in the generation of the second display image, the enlargement ratio and the reduction ratio of the second display image, and a pixel region in which the second display image is displayed.

According to this aspect, it is possible to harmonize the second display image to be displayed on the first display device and the second display image to be displayed on the second display device, by making them different in at least any one of the pixels that are used in the generation of the second display image, the scaling ratio (the enlargement ratio and the reduction ratio) of the second display image, and the pixel region in which the second display image is displayed.

Here, making the first display device and the second display device different in the "pixels that are of the first pixel group and the second pixel group and that are used in the generation of the second display image" means that there is, at least at a portion, a difference between the pixels that substantially contribute to the generation of the second display image to be displayed on the first display device and the pixels that substantially contribute to the generation of the second display image to be displayed on the second display device. Therefore, the pixels that substantially contribute to the generation of the second display image to be displayed on the first display device may contain a whole or a part of the pixels that substantially contribute to the generation of the second display image to be displayed on the second display device. Thereby, the second display image to be displayed on the first display device is generated by the "pixels that are of the first pixel group and the second pixel group and that are used in the generation of the second display image" optimized to the resolution of the first display device, and the second display image to be displayed on the second display device is generated by the "pixels that are of the first pixel group and the second pixel group and that are used in the generation of the second display image" optimized to the resolution of the second display device. Thereby, it is possible to harmonize the second display images to be displayed on the first display device and the second display device.

Further, making the first display device and the second display device different in the "enlargement ratio and reduction ratio of the second display image" means that the enlargement ratio/reduction ratio of the second display image to be displayed on the first display device is different from the enlargement ratio/reduction ratio of the second display image to be displayed on the second display device. Therefore, the second display image to be displayed on the first display device is generated by the "enlargement ratio or reduction ratio to the image data (image) that is obtained from the first pixel group and second pixel group of the imaging element" optimized to the resolution of the first display device, and the second display image to be displayed on the second display device is generated by the "enlargement ratio or reduction ratio to the image data (image) that is obtained from the first pixel group and second pixel group of the imaging element" optimized to the resolution of the second display device. Thereby, it is possible to harmonize the second display images to be displayed on the first display device and the second display device.

Further, making the first display device and the second display device different in the "pixel region in which the second display image is displayed" means that the pixel region (display region) for the second display image to be displayed on the first display device is different from the second display image to be displayed on the second display device, and it is only necessary to be different in at least any one of factors such as the number of constituent pixels relative to the whole display region, and the display position. Therefore, the second display image to be displayed on the first display device is generated so as to correspond to the "pixel region in which the second display image is displayed" optimized to the resolution of the first display device, and the second display image to be displayed on the second display device is generated so as to correspond to the "pixel region in which the second display image is displayed" optimized to the resolution of the second display device. Thereby, it is possible to harmonize the second display images to be displayed on the first display device and the second display device.

Further, the case of "the first display image and the second display image are different in at least any one of the decimation ratio, enlargement ratio and reduction ratio of the first display image and the second display image" can include the case where the first display image and second display image to be displayed on the first display device and/or the second display device are different in the "degree of the decimation of the pixels on the imaging element that contribute to the image generation (the pixel pitch (interval) on the imaging element)" or the "ratio of the number of the constituent pixels of the display image relative to the pixels on the imaging element that contribute to the image generation", for example.

Here, in the present specification, "the same", "identical", "matched" or an expression equivalent thereto does not necessarily show only the case of being completely "the same", "identical" or "matched", and can include also the case of being substantially "the same", "identical" or "matched".

Preferably, the number of pixels in a display region of the first display device be greater than the number of pixels in a display region of the second display device.

In the case where the number of pixels in the display region of the first display device and the number of pixels in the display region of the second display device are different, such as this aspect, the usability for a user is likely to be poor. However, according to this aspect, it is possible to harmonize the second display image to be displayed on the first display device and the second display image to be displayed on the second display device, and to improve the usability.

Preferably, the image generation device generate the second display image by performing at least any one of a decimation process, an enlargement process and a reduction process, and match the second display image to be displayed on the first display device and the second display image to be displayed on the second display device, in at least any one of the decimation ratio of the pixels that are of the first pixel group and the second pixel group and that are used in the generation of the second display image, the enlargement ratio of the second display image, and the reduction ratio of the second display image.

According to this aspect, it is possible to harmonize the second display image to be displayed on the first display device and the second display image to be displayed on the second display device, by matching them in at least any one of the decimation ratio of the pixels that are of the first pixel group and the second pixel group and that are used in the generation of the second display image, the enlargement ratio of the second display image, and the reduction ratio of the second display image. The "match" herein is not necessarily limited to the "case of being completely matched", and the "case of being roughly matched" is also applicable.

Preferably, the image generation device make the second display image to be displayed on the first display device and the second display image to be displayed on the second display device different in the pixels that are of the first pixel group and the second pixel group and that are used in the generation of the second display image.

According to this aspect, it is possible to harmonize the second display image to be displayed on the first display device and the second display image to be displayed on the second display device, by making them different in the pixels that are used in the generation of the second display image.

The "making them different in the pixels that are used in the generation of the second display image" herein means excluding the case where completely identical pixels are used between the second display image to be displayed on the first display device and the second display image to be displayed on the second display device. Therefore, it is not necessarily limited to the case where completely different pixels are used in the generation of the second display image between the second display image to be displayed on the first display device and the second display image to be displayed on the second display device, and pixels common between the two may be contained.

Preferably, the image generation device make the second display image to be displayed on the first display device and the second display image to be displayed on the second display device different in a pixel range on the imaging element that is of the first pixel group and the second pixel group and that is used in the generation of the second display image.

According to this aspect, it is possible to harmonize the second display image to be displayed on the first display device and the second display image to be displayed on the second display device, by making them different in the pixel range on the imaging element that is used in the generation of the second display image.

The "making them different in the pixel range on the imaging element that is used in the generation of the second display image" herein means excluding the case where the pixels in a completely identical pixel range are used between the second display image to be displayed on the first display device and the second display image to be displayed on the second display device. Therefore, it is not necessarily limited to the case where the pixels in completely different pixel ranges are used in the generation of the second display image between the second display image to be displayed on the first display device and the second display image to be displayed on the second display device, and a pixel range common between the two may be contained.

Preferably, in the generation of the second display image, the image generation device use all of the pixels contained in a pixel range on the imaging element that is of the first pixel group and the second pixel group and that is used in the generation of the second display image.

According to this aspect, since all of the pixels of the first pixel group and second pixel group contained in the pixel range on the imaging element that is used in the generation of the second display image are used in the generation of the second display image, it is possible to generate the second display image with a high quality.

Preferably, pixels on the imaging element that are used in the generation of at least any one of the second display image to be displayed on the first display device and the second display image to be displayed on the second display device be all of the pixels that constitute the first pixel group and the second pixel group.

Preferably, pixels on the imaging element that are used in the generation of at least any one of the second display image to be displayed on the first display device and the second display image to be displayed on the second display device be some of the pixels that constitute the first pixel group and the second pixel group.

Preferably, the image generation device make the first display device and the second display device different in the enlargement ratio and the reduction ratio of the second display image, such that an angular field range of the second display image to be displayed on the first display device and an angular field range of the second display image to be displayed on the second display device are the same.

According to this aspect, by making the first display device and the second display device different in the scaling ratio of the second display image, the angular field range of the second display image to be displayed on the first display device and the angular field range of the second display image to be displayed in the second display device become the same. Therefore, a user can check the second display images having the same angular field range, on both of the first display device and the second display device.

Preferably, the number of pixels that constitute a display region for the second display image on the first display device, and the number of pixels that are of the first pixel group and the second pixel group and that contribute to the generation of the second display image to be displayed on the first display device be the same.

According to this aspect, since the number of pixels that are of the first pixel group and the second pixel group and that contribute to the generation of the second display image to be displayed on the first display device is the same as the number of pixels that constitute the display region for the second display image on the first display device, it is possible to display the second display image on the first display device, without enlarging or reducing the image.

Preferably, the number of pixels that constitute a display region for the second display image on the second display device, and the number of pixels that are of the first pixel group and the second pixel group and that contribute to the generation of the second display image to be displayed on the second display device be the same.

According to this aspect, since the number of pixels that are of the first pixel group and the second pixel group and that contribute to the generation of the second display image to be displayed on the second display device is the same as the number of pixels that constitute the display region for the second display image on the second display device, it is possible to display the second display image on the second display device, without enlarging or reducing the image.

Preferably, the image generation device generate the second display image to be displayed on the first display device and the second display image to be displayed on the second display device, such that a relative size of a display region for the second display image to the whole display region of the first display device is different from a relative size of a display region for the second display image to the whole display region of the second display device and an angular field range of the second display image to be displayed on the first display device and an angular field range of the second display image to be displayed on the second display device are the same.

According to this aspect, on the first display device and the second display device, it is possible to display the second display images that are different in the relative size of the display region for the second display image to the whole display region but that are the same in the angular field range.

Preferably, the image generation device generate the second display image to be displayed on the first display device and the second display image to be displayed on the second display device, such that a relative size of a display region for the second display image to the whole display region of the first display device is different from a relative size of a display region for the second display image to the whole display region of the second display device.

According to this aspect, on the first display device and the second display device, it is possible to display the second display images that are different in the relative size of the display region to the whole display region.

Preferably, the image generation device generate the second display image to be displayed on the first display device and the second display image to be displayed on the second display device, such that a relative size of a display region for the second display image to the whole display region of the first display device is the same as a relative size of a display region for the second display image to the whole display region of the second display device.

According to this aspect, on the first display device and the second display device, it is possible to display the second display images that are the same in the relative size of the display region to the whole display region.

Preferably, the imaging element further include a third pixel group that outputs a third image signal, the third pixel group being a pixel group on which the object image is formed without pupil division, and the image generation device generate the first display image based on the third image signal.

According to this aspect, the first display image is generated based on the third image signal from the third pixel group on which the object image is formed without pupil division.

Preferably, in at least one of the first display device and the second display device, the first display image and the second display image be the same in a parameter that is of parameters including the decimation ratio, the enlargement ratio and the reduction ratio of the first display image and the second display image and that is associated with a process to be performed when the image generation device generates the first display image and the second display image.

According to this aspect, it is possible to harmonize the first display image and second display image on at least one of the first display device and the second display device, by making them the same in the parameter that is of parameters including the decimation ratio, the enlargement ratio and the reduction ratio of the first display image and the second display image and that is associated with a process to be performed when the image generation device generates the first display image and the second display image.

Another aspect of the present invention relates to an imaging device including: an imaging element including a first pixel group and a second pixel group on which an object image passing through a first region and a second region of a photographing lens is pupil-divided and formed, respectively, and any of the above image processing devices.

Another aspect of the present invention relates to an image processing method including: a step of generating a first display image based on an image signal and generating a second display image from a first image and a second image, the image signal being output from an imaging element, the imaging element including a first pixel group and a second pixel group on which an object image passing through a first region and a second region of a photographing lens is pupil-divided and formed, respectively, the second display image being used for focus check, the first image and the second image being based on a first image signal and a second image signal that are output from the first pixel group and the second pixel group; and a step of displaying the first display image on at least one of the first display device and the second display device and displaying the second display image within a display region for the first display image, in which the first display image and the second display image are generated such that the first display image and the second display image are different in at least any one of decimation ratio, enlargement ratio and reduction ratio of the first display image and the second display image, and the first display device and the second display device are different in at least any one of pixels that are of the first pixel group and the second pixel group and that are used in the generation of the second display image, the enlargement ratio and the reduction ratio of the second display image, and a pixel region in which the second display image is displayed.

Another aspect of the present invention relates to a non-transitory computer-readable medium having a program thereon causing a computer to execute: a step of generating a first display image based on an image signal and generating a second display image from a first image and a second image, the image signal being output from an imaging element, the imaging element including a first pixel group and a second pixel group on which an object image passing through a first region and a second region of a photographing lens is pupil-divided and formed, respectively, the second display image being used for focus check, the first image and the second image being based on a first image signal and a second image signal that are output from the first pixel group and the second pixel group; and a step of displaying the first display image on at least one of the first display device and the second display device and displaying the second display image within a display region for the first display image, in which the first display image and the second display image are generated such that the first display image and the second display image are different in at least any one of decimation ratio, enlargement ratio and reduction ratio of the first display image and the second display image, and the first display device and the second display device are different in at least any one of pixels that are of the first pixel group and the second pixel group and that are used in the generation of the second display image, the enlargement ratio and the reduction ratio of the second display image, and a pixel region in which the second display image is displayed.

Another aspect of the present invention relates to an image processing device including: an image generation device configured to generate a second display image to be used for focus check, based on an image signal, the image signal being output from an imaging element, the imaging element including a first pixel group and a second pixel group on which an object image passing through a first region and a second region of a photographing lens is pupil-divided and formed, respectively, the image generation device generating the second display image to be used for the focus check, from the first image and the second image, the first image and the second image being based on a first image signal and a second image signal that are output from the first pixel group and the second pixel group; a first display device and a second display device configured to display the second display image; and a display control device configured to perform such a control that the second display image is displayed on at least one of the first display device and the second display device, in which the image generation device makes the first display device and the second display device different in at least any one of pixels that are of the first pixel group and the second pixel group and that are used in the generation of the second display image, the enlargement ratio and the reduction ratio of the second display image, and a pixel region in which the second display image is displayed.

According to this aspect, even when only the second display image is displayed on the first display device and the second display device, it is possible to harmonize the second display image to be displayed on the first display device and the second display image to be displayed on the second display device, by making them different in at least any one of the pixels that are used in the generation of the second display image, the scaling ratio of the second display image, and the pixel region in which the second display image is displayed.

According to the present invention, it is possible to harmonize the second display image to be displayed on the first display device and the second display image to be displayed on the second display device, by making them different in at least any one of the pixels that are used in the generation of the second display image, the enlargement ratio and the reduction ratio of the second display image, and the pixel region in which the second display image is displayed. Therefore, a user can use the harmonized second display images for focus check, on both of the first display device and the second display device. Accordingly, the present invention can actualize a comfortable usability.

BRIEF DESCRIPTION OF THE DRAWINGS

FIG. 1B shows a back view, FIG. 1C shows a top view, and FIG. 1D shows a perspective view of a lens unit.

FIGS. 6A and 6B are cross-section views showing a configuration of a phase difference pixel, in which FIG. 6A shows a first phase difference pixel, and FIG. 6B shows a second phase difference pixel.

FIG. 8A to 8C are plan views showing another pixel array example of the color imaging element (phase-difference-pixel arrangement region).

FIG. 11 is a block diagram showing a modification of the image processing circuit.

FIG. 12B shows an out-of-focus state.

FIG. 13 is a flowchart showing a photographing process flow at the time of a manual focus mode.

FIGS. 15A and 15B show display units to display the normal image and the split image in the first embodiment, in which FIG. 15A shows an image display example on the EVF and FIG. 15B shows an image display example on the rear LCD.

FIGS. 16A and 16B show display units to display the normal image and the split image in a second embodiment, in which FIG. 16A shows an image display example on the EVF and FIG. 16B shows an image display example on the rear LCD.

DETAILED DESCRIPTION OF THE PREFERRED EMBODIMENTS

Hereinafter, embodiments of the present invention are described in detail, with reference to the drawings. First, the basic configuration of a digital camera that is an application example of the present invention is described (see FIG. 1 to FIG. 13), and thereafter, specific techniques for displaying a split image on a plurality of display units are described (see FIG. 14 to FIG. 16B).

Figure 1A:
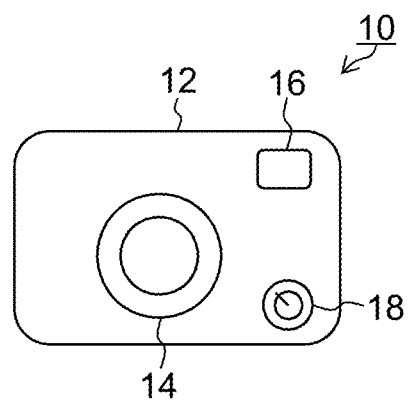
FIGS. 1A to 1D are diagrams showing the outline of an external configuration of a digital camera, in which the FIG. 1A shows a front view.
Figure 1C:
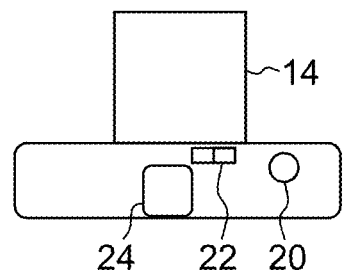
Figure 1B:
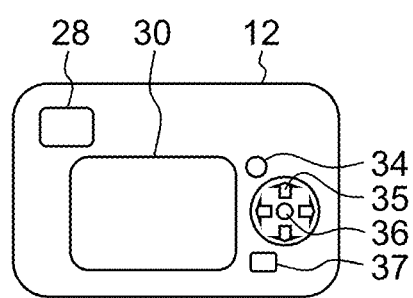
Figure 1D:
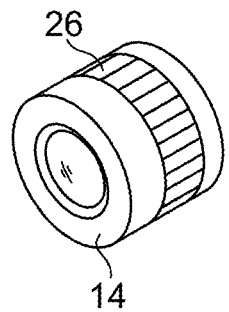

FIGS. 1A to 1D are diagrams showing the outline of an external configuration of a digital camera, in which FIG. 1A shows a front view, FIG. 1B shows a back view, FIG. 1C shows a top view, and FIG. 1D shows a perspective view of a lens unit.

A digital camera (an image processing device and an imaging device) 10 includes a camera body 12 and a lens unit 14 that is interchangeably attached to the front surface of the camera body 12. Further, a strobe light emitting unit 16 and a focus mode switching lever 18 are provided on the front surface of the camera body 12.

To the lens unit 14, which includes an imaging optical system such as lenses, a focus ring 26 to be used for the focusing (focusing operation) at the time of manual focus operation is rotatably attached (see FIG. 1D).

The focus mode switching lever 18 is a lever for switching the focus mode, and by operating the focus mode switching lever 18, a user can appropriately perform the switching between an automatic focus mode (a single AF, a continuous AF) and a manual focus mode. The spot where the focus mode switching lever 18 is provided is not limited to the front surface of the camera body 12, and the focus mode switching lever 18 may be provided on the top surface of the camera body 12 or the lens unit 14, for example.

On the top surface (see FIG. 1C) of the camera body 12, a shutter button 20, a power switch 22 and a hot shoe 24 are provided. The power switch 22 is a switch for switching the ON/OFF of the power of the digital camera 10 (the camera body 12). To the hot shoe 24, external devices (a flash lamp, a viewfinder or the like) are attached as necessary.

The shutter button 20 is configured to be able to detect a two-step pressing operation: a state of being pushed down to an intermediate position (hereinafter, referred to as a "half-push state") and a state of being pushed down to a limit push-down position exceeding the intermediate position (hereinafter, referred to as a "full-push state"). In the automatic focus mode, when the shutter button 20 is put into the half-push state, an AE (Automatic Exposure) function acts so that an exposure state (a shutter speed and a diaphragm value) is set, and thereafter, an AF (Auto Focus) function acts so that the focus control is performed. Thereafter, when the shutter button 20 is successively put into the full-push state, a photographic exposure (photographing) is performed.

On the back surface (see FIG. 1B) of the camera body 12, a built-in EVF (Electronic View Finder: first display device) 28, a rear LCD (Liquid Crystal Display: second display device) 30, a mode switching button 34, a cross key 35, an execution key 36 and a back button 37 are provided.

The EVF 28 and the rear LCD 30 function as display units to display a taken image. Particularly, the EVF 28 and the rear LCD 30 in the example each display a normal image (first display image) and a split image (second display image), at the time of the manual focus mode. The image display region of the EVF 28 and the image display region of the rear LCD 30 are different in resolution (the number of constituent pixels). The following example describes the case where the resolution in the image display region of the EVF 28 is higher than the resolution in the image display region of the rear LCD 30 and the number of the constituent pixels of the image display region of the EVF 28 is larger than the number of the constituent pixels of the image display region of the rear LCD 30.

The mode switching button 34 functions as a button for performing the switching between a photographing mode and an image (still image/moving image) playback mode. The cross key 35 and the execution key 36 are operated for displaying a menu screen or a setting screen on the rear LCD 30, moving a selection cursor on the menu screen or the setting screen, determining various settings of the digital camera 10, for example. The back button 37 functions as a button for cancelling the last operation on the menu screen or the setting screen. To these buttons and keys, a plurality of functions may be assigned. For example, the back button 37 may function as a button for switching the information (photographing condition and the like) to be displayed on the EVF 28 or the rear LCD 30.

Although the illustration is omitted, the bottom surface of the camera body 12 is provided with a card slot into which a memory card is loaded, and a load cover that opens and closes the opening of the card slot.

Figure 2:
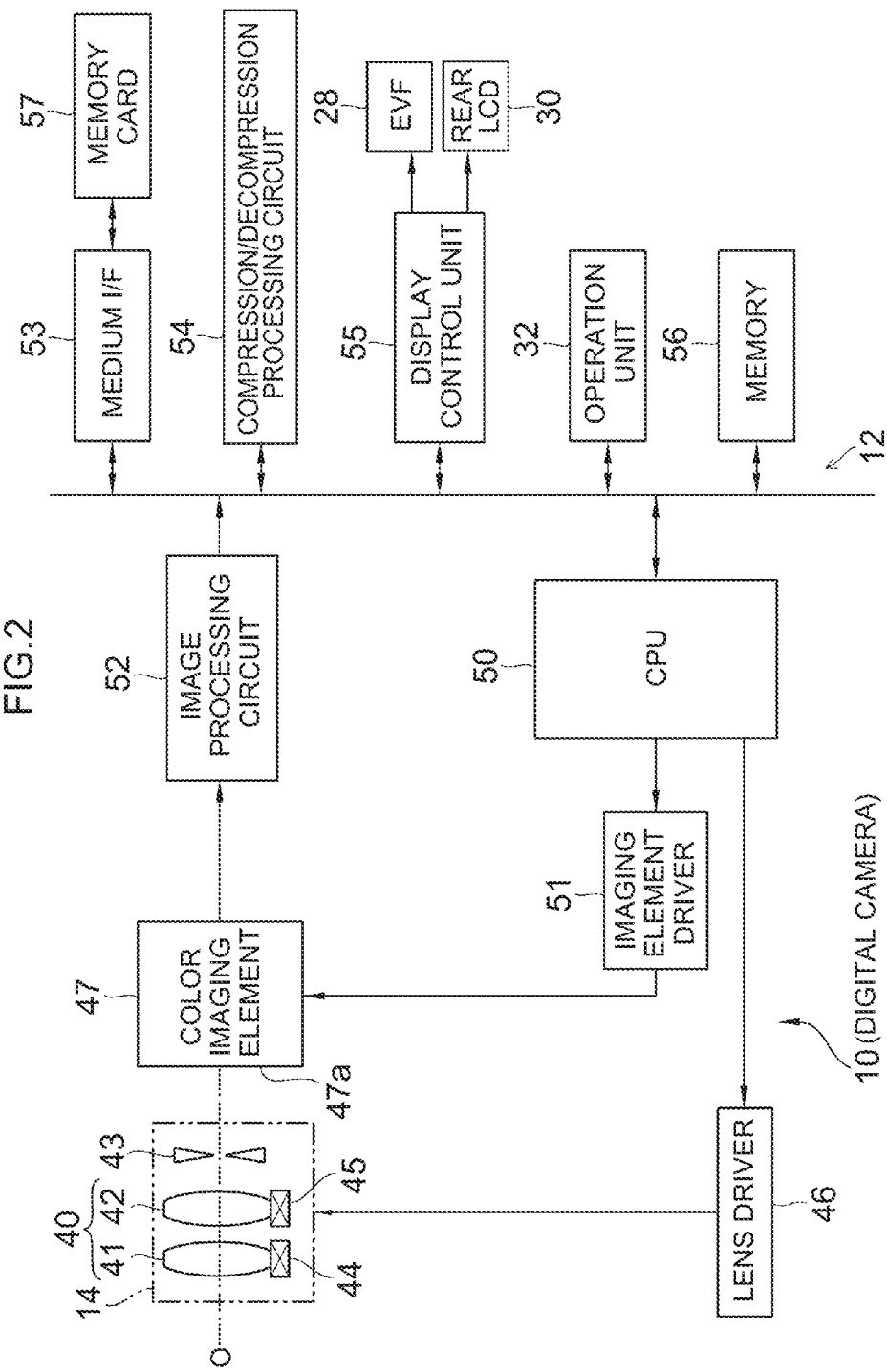
FIG. 2 is a block diagram showing a connection relation among the respective units that constitute the digital camera.

FIG. 2 is a block diagram showing a connection relation among the respective units that constitute the digital camera 10. Here, in the example, an example in which the respective units other than the lens unit 14 in the configuration shown in FIG. 2 are provided in the camera body 12 is described. However, as necessary, the respective units may be provided in the lens unit 14.

The lens unit 14 has a photographing optical system 40 including a zoom lens 41 and a focus lens 42, a mechanical shutter 43, and the like.

The zoom lens 41 and the focus lens 42 are driven by a zoom mechanism 44 and a focus mechanism 45, respectively, and are moved back and forth along an optical axis O1 of the photographing optical system 40. The zoom mechanism 44 and the focus mechanism 45 are configured by gears, motors and the like.

The focus mechanism 45 is connected with the focus ring 26 (see FIG. 1D) through a gear not shown in the figure. At the time of the manual focus mode, with the rotating operation (focus operation) of the focus ring 26 by a user, the focus mechanism 45 moves the focus lens 42 along the direction of the optical axis O1 (hereinafter, referred to as the optical axis direction). Here, the connection scheme between the focus ring 26 and the focus mechanism 45 is not particularly limited. For example, the focus ring 26 and the focus mechanism 45 may be mechanically connected, and the focus lens 42 may be directly driven by the rotating motion of the focus ring 26. Further, the rotating motion of the focus ring 26 may be changed into an electric signal in a CPU 50, and the lens driver 46 and the focus mechanism 45 may drive the focus lens 42 based on the electric signal.

The mechanical shutter 43 includes a moving unit (the illustration is omitted) to move move between a closing position where the incidence of object light to a color imaging element 47 is blocked and an opening position where the incidence of the object light is allowed. When the moving unit is moved to the opening position/closing position, an optical path from the photographing optical system 40 to the color imaging element 47 is opened/shut. Further, the mechanical shutter 43 includes a diaphragm to control the light quantity of the object light that enters the color imaging element 47. The mechanical shutter 43, the zoom mechanism 44 and the focus mechanism 45 are driven and controlled by the CPU 50 through the lens driver 46.

Based on a control signal from an operation unit 32, the CPU 50 provided in the camera body 12 sequentially executes a variety of programs and data that are read from a memory 56, and integrally controls the respective units of the digital camera 10. A RAM region of the memory 56 functions as a work memory for the execution of a process by the CPU 50 and a temporary saving location for a variety of data.

Figure 3:
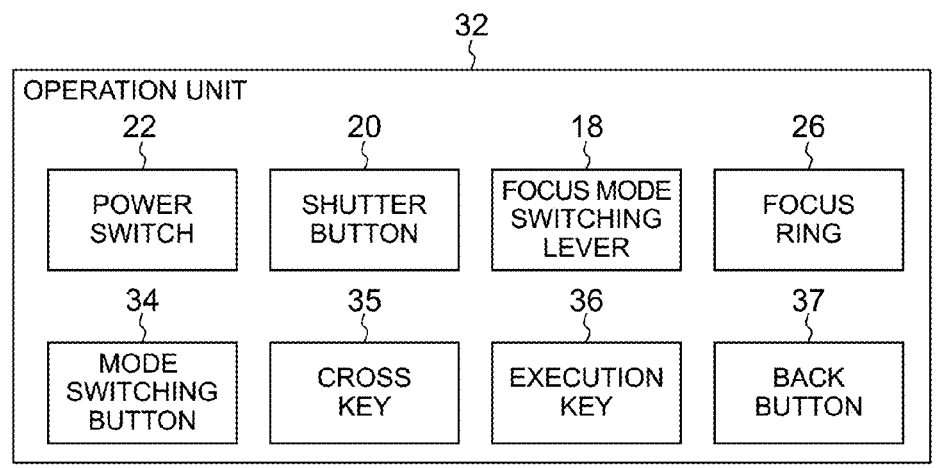
FIG. 3 is a block diagram showing the configuration of an operation unit.

The operation unit 32 includes buttons and keys that are operated by a user. As shown in FIG. 3, the operation unit 32 in the example is configured to include the power switch 22, the shutter button 20, the focus mode switching lever 18, the focus ring 26, the mode switching button 34, the cross key 35, the execution key 36 and the back button 37 described above.

The color imaging element 47 shown in FIG. 2 converts the object light passing through the photographing optical system 40 and the mechanical shutter 43 into an electric output signal, and outputs it. The color imaging element 47 is configured such that many pixels are juxtaposed in the horizontal direction and the vertical direction, and allows for the adoption of an arbitrary scheme such as a CCD (Charge Coupled Device) and a CMOS (Complementary Metal Oxide Semiconductor).

Each pixel constituting the color imaging element 47, described later in detail, includes a micro-lens for enhancing the light condensation rate, a color filter of RGB or the like, and a photodiode to receive the light passing through the micro-lens and the color filter. Particularly, the color imaging element 47 in the example includes a first phase difference pixel group (first pixel group) and a second phase difference group (second pixel group) on which an object image passing through a first region and a second region of the photographing optical system 40 (photographing lens) is pupil-divided and formed, in addition to a normal pixel group (third pixel group) on which the object image is formed without the pupil division.

An imaging element driver 51 drives and controls the color imaging element 47 under the control of the CPU 50, and makes the pixels of the color imaging element 47 output imaging signals to an image processing circuit 52.

The image processing circuit (image generation device) 52 performs a gradation conversion, a white balance correction, a γ correction process and the like, for the output signals (outputs) from the color imaging element 47, and thereby, generates taken image data.

At the time of the manual focus mode, the image processing circuit 52 in the example, described later in detail, generates the normal image (first display image) based on the image signals output from the color imaging element 47, and generates the split image (second display image) to be used for focus check, from a first image and a second image that are based on a first image signal and a second image signal output from the first phase difference pixel group (first pixel group) and the second phase difference pixel group (second pixel group). On this occasion, the image processing circuit 52 generates the normal image and the split image such that the normal image and the split image are different in at least any one of the decimation ratio, enlargement ratio and reduction ratio of the normal image and the split image. The normal image data and the split image data are temporarily stored in a VRAM region (a VRAM may be separately provided) of the memory 56. The VRAM region has a memory area for a live-view image that stores two successive field fractions, and sequentially overwrites and stores the taken image data and the split image data.

When a user performs the push-down operation of the shutter button 20, a compression/decompression processing circuit 54 performs a compression process for the taken image data stored in the VRAM region. Further, the compression/decompression processing circuit 54 performs a decompression process for compressed image data to be obtained from a memory card 57 through a medium interface 53. The medium interface 53 performs the recording, reading and others of the taken image data for the memory card 57.

At the time of the photographing in the manual focus mode, a display control unit (display control device) 55 controls at least one of the EVF 28 and the rear LCD 30 such that the normal image generated by the image processing circuit 52 is displayed and the split image generated by the image processing circuit 52 is displayed within the display region for the normal image. That is, at the time of the photographing in the manual focus mode, the display control unit 55 reads the taken image data and split image data stored in the VRAM region, and sequentially outputs them to the EVF 28 and/or the rear LCD 30.

Further, at the time of the photographing in the automatic focus mode, the display control unit 55 displays the normal image generated by the image processing circuit 52, as a live-view image, on at least one of the EVF 28 and the rear LCD 30. Here, at the time of the image playback mode, the display control unit 55 outputs the taken image data decompressed in the compression/decompression processing circuit 54, to the rear LCD 30 (and/or the EVF 28).

The digital camera 10 (the camera body 12) is provided with other processing circuits besides the above, and the like, and for example, is provided with an AF detection circuit for the automatic focus. The AF detection circuit analyzes an image to be composed by the output signal of the first phase difference pixel and an image to be composed by the output signal of the second phase difference pixel, which are described later, detects the shift direction between both images and the shift amount between both images, and thereby determines a focus adjustment amount (referred to as a defocus amount) for the photographing optical system 40. Based on the focus adjustment amount, the CPU 50 controls the lens driver 46, drives the focus lens 42 through the focus mechanism 45, and thereby performs the focus adjustment. Here, such an AF process with a phase difference scheme is known, and therefore, the specific description is omitted herein.

Further, the digital camera 10 (the camera body 12) is provided with an AE detection circuit, which is omitted in the figure. Based on the detection result of the AE detection circuit, the CPU 50 drives the mechanical shutter 43 through the lens driver 46, and thereby, executes an AE process.

Next, the color imaging element 47 is described.

Figure 4:
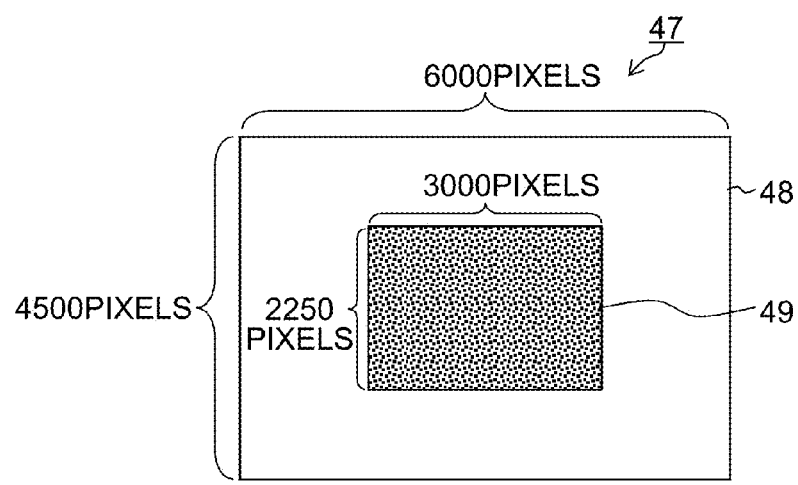
FIG. 4 is a plan view of a color imaging element.

FIG. 4 is a plan view of the color imaging element 47. The color imaging element 47 in the example has a phase-difference-pixel arrangement region 49 positioned at the central portion and a normal pixel region 48 positioned at the peripheral portion.

The normal pixel region 48 is a region that is constituted by only normal pixels 60 (that does not contain any phase difference pixel), and the phase-difference-pixel arrangement region 49 is a region where normal pixels and phase difference pixels are present in a mixed manner. The phase difference pixel is a pixel that is utilized at the time of the automatic focus, and therefore, the phase-difference-pixel arrangement region 49 is provided so as to correspond to an AF region (automatic focus region).

In the example, the phase-difference-pixel arrangement region 49 is defined as a ½ region of the color imaging element 47 with respect to the horizontal direction and the vertical direction, and the phase-difference-pixel arrangement region 49 is constituted by pixels (normal pixels and phase difference pixels) corresponding to ¼ of all pixels that constitute the color imaging element 47. Therefore, for example, when the color imaging element 47 is constituted by horizontal 6000 pixels and vertical 4500 pixels (all pixels=6000×4500=27,000,000 pixels), the phase-difference-pixel arrangement region 49 corresponds to a region that is constituted by horizontal 3000 pixels and vertical 2250 pixels (all pixels=3000×2250=6,750,000 pixels) at the central portion.

Figure 5:
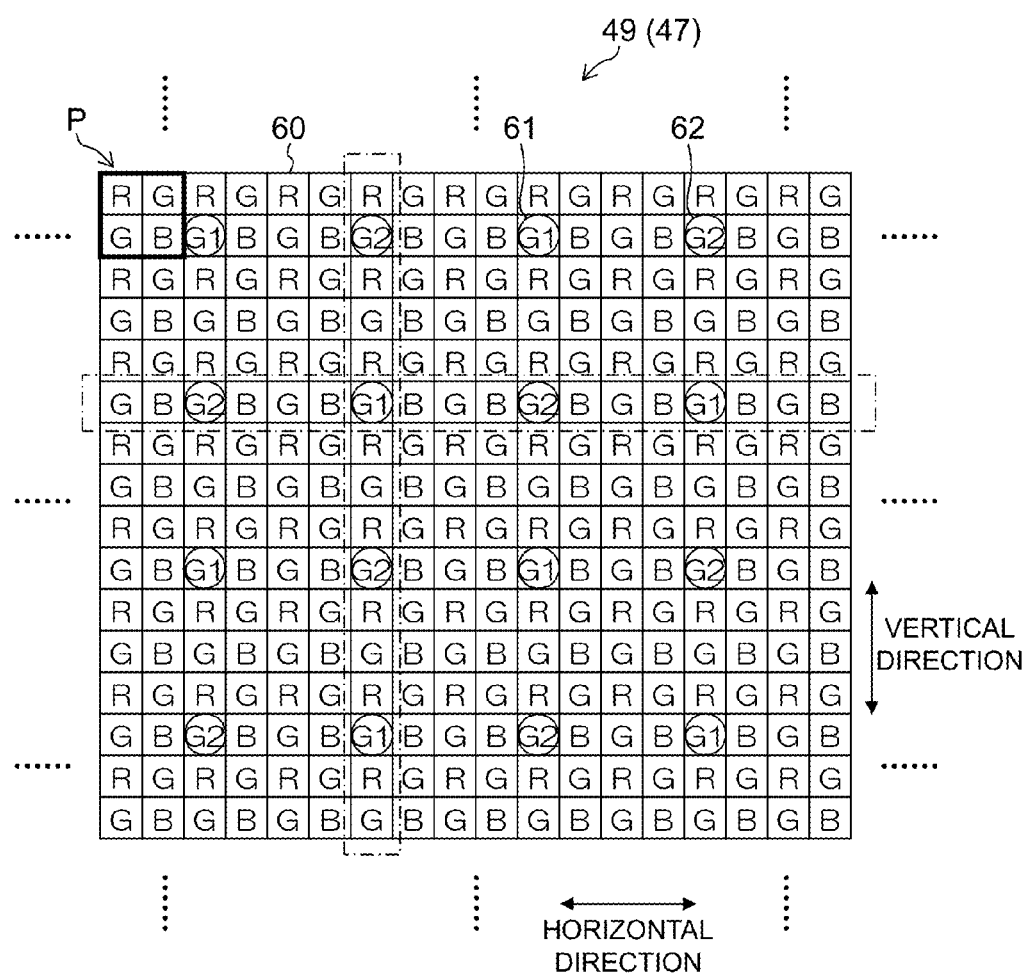
FIG. 5 is a partial enlarged plan view of a phase-difference-pixel arrangement region when the pixel array of the color imaging element is the Bayer array.

FIG. 5 is a partial enlarged plan view of the phase-difference-pixel arrangement region 49 when the pixel array of the color imaging element 47 is the Bayer array.

The Bayer array has, as a basic array P, a pixel array that is configured by a total of 4 pixels: 2 pixels×2 pixels in the horizontal direction and the vertical direction. The basic array P is configured such that horizontally juxtaposed "an R (red) pixel and a G (green) pixel" and "a G pixel and a B (blue) pixel" are juxtaposed in the vertical direction. A plurality of the basic arrays P are successively juxtaposed in the horizontal direction and the vertical direction, and thereby the Bayer-type color imaging element 47 is configured.

In the example shown in FIG. 5, in the phase-difference-pixel arrangement region 49, the phase difference pixel (a first phase difference pixel 61, a second phase difference pixel 62) is arranged at positions of G pixels that are arranged every four pixels (at four pixel intervals) in each of the horizontal direction and the vertical direction. As described later, the first phase difference pixel 61 and the second phase difference pixel 62 constitute one pair, and the first phase difference pixel 61 and the second phase difference pixel 62 receive left and right light fluxes after the division by pupil division, respectively. In the example shown in FIG. 5, at phase difference pixel positions arranged every four pixels, the first phase difference pixel 61 and the second phase difference pixel 62 are alternately arranged, in each of the horizontal direction and the vertical direction. Therefore, in the color imaging element 47 in the example, the pixels (the first phase difference pixel 61, the second phase difference pixel 62) to be used for the split image are essentially arranged only every several pixels (every four pixels in the example shown in FIG. 5), and therefore, the resolution level is low compared to the normal pixels for generating the normal image.

FIGS. 6A and 6B are cross-section views showing a configuration of the phase difference pixel, in which FIG. 6A shows the first phase difference pixel, and FIG. 6B shows the second phase difference pixel.

The first phase difference pixel 61 and the second phase difference pixel 62 include a micro-lens L, a color filter CF, a light-shielding member 66 (66A, 66B) and a photodiode PD that are arranged in order in the advancing direction of the light passing the photographing optical system 40 and the mechanical shutter 43, and specially, the micro-lens L and the light-shielding member 66 function as a pupil-division device.

The light-shielding member 66A arranged in the first phase difference pixels 61 shields the left half of the light receiving surface of the photodiode PD with respect to FIG. 6. By this configuration, in the first phase difference pixel 61, the photodiode PD receives only the light flux that is of the light flux to pass through the exit pupil of the photographing lens and that passes through the left side to the optical axis. On the other hand, the light-shielding member 66B arranged in the second phase difference pixels 62 shields the right half of the light receiving surface of the photodiode PD with respect to FIG. 6. By this configuration, in the second phase difference pixel 62, the photodiode PD receives only the light flux that is of the light flux to pass through the exit pupil of the photographing lens and that passes through the right side to the optical axis. Therefore, the light flux passing through the exit pupil is divided into left and right by the micro-lens L and the light-shielding member 66 that are the pupil division device, and they enter the first phase difference pixel 61 and the second phase difference pixel 62, respectively.

Here, the normal pixel 60, which is arranged in the normal pixel region 48 and the phase-difference-pixel arrangement region 49, is not provided with the light-shielding member 66 in the configurations of the first phase difference pixel 61 and the second phase difference pixel 62 shown in FIG. 6. Therefore, in the normal pixel 60, the light flux having passed through the micro-lens L and the color filter CF enters the photodiode PD without being shielded.

As shown in FIG. 4, the first phase difference pixel 61 and the second phase difference pixel 62 are provided in the phase-difference-pixel arrangement region 49, which is the AF region at the central portion of the imaging region of the color imaging element 47. As for the first phase difference pixel 61 and the second phase difference pixel 62, it is preferable that about several tens of pixels to a hundred pixels be arranged in a phase difference detection direction. Here, without being limited to the example shown in FIG. 4, the phase-difference-pixel arrangement region 49 may have an arbitrary position and range of the color imaging element 47, and also the arrangement pattern is not particularly limited. For example, a plurality of the phase-difference-pixel arrangement regions 49 may be provided in the photographing region of the color imaging element 47, or the phase-difference-pixel arrangement region 49 may be the whole region of the photographing region.

Further, without being limited to the above example of the Bayer array, the color imaging element 47 can have an arbitrary pixel array, pixel number, color filter and the like.

Figure 7:
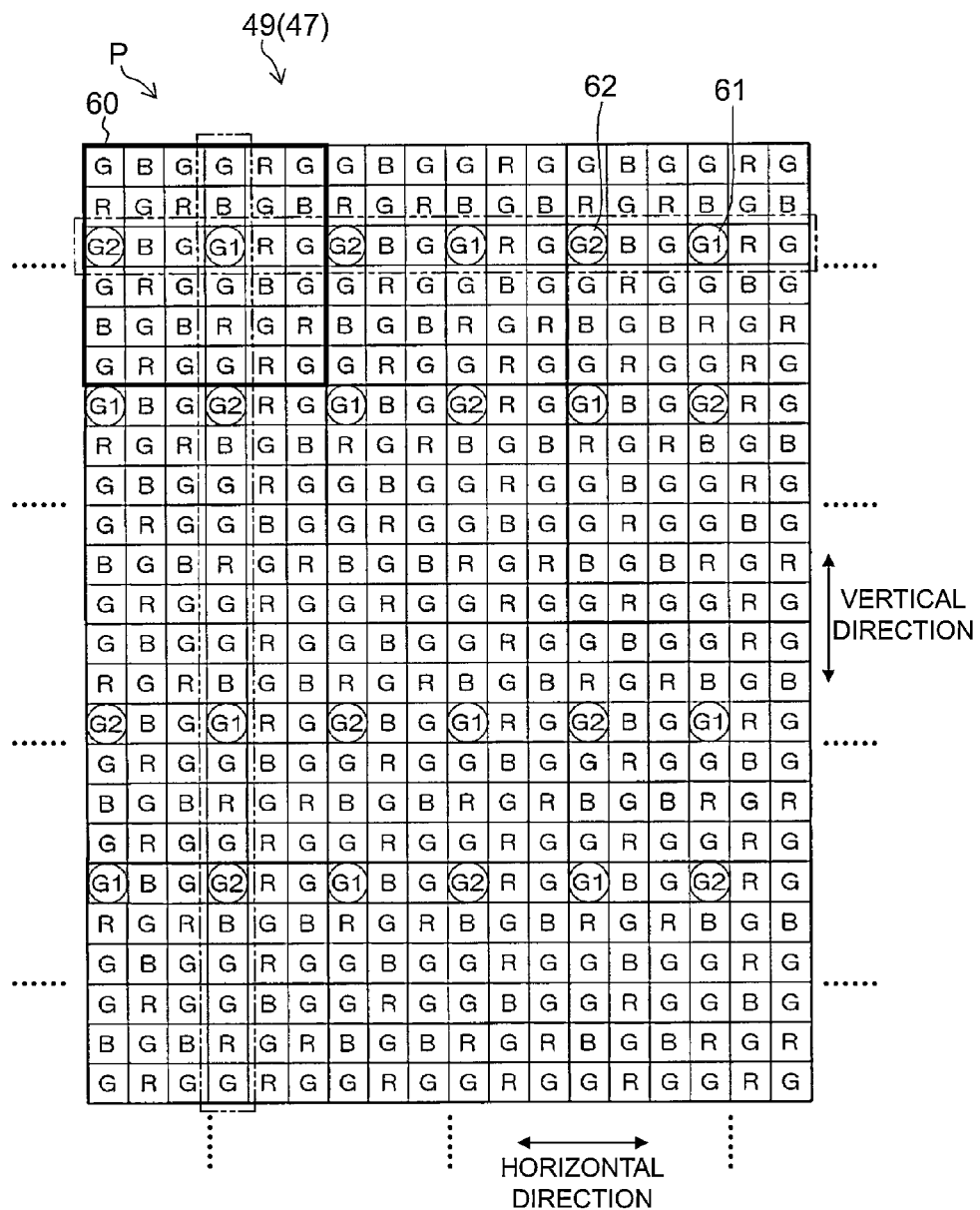
FIG. 7 is a plan view showing another pixel array example of the color imaging element (phase-difference-pixel arrangement region).

FIG. 7 is a plan view showing another pixel array example of the color imaging element 47 (the phase-difference-pixel arrangement region 49). In the example shown in FIG. 7, the basic array P is a pixel array that is configured by a total of 36 pixels: 6 pixels×6 pixels in the horizontal direction and the vertical direction. The basic array P is configured such that horizontally juxtaposed "GBGGRG pixels", "RGRBGB pixels", "GBGGRG pixels", "GRGGBG pixels", "BGBRGR pixels" and "GRGGBG pixels" are juxtaposed in the vertical direction. Each basic array P includes one pair of the first phase difference pixel 61 and the second phase difference pixel 62, and the first phase difference pixel 61 and the second phase difference pixel 62 are alternately arranged every three pixels (at three pixel intervals) in the horizontal direction. On the other hand, also in the vertical direction, the first phase difference pixel 61 and the second phase difference pixel 62 are alternately arranged. The first phase difference pixels 61 and second phase difference pixels 62 juxtaposed in the vertical direction are arranged so as to have alternately a first pixel interval (a four pixel interval (every four pixels) in the example shown in FIG. 7) and a second pixel interval (an eight pixel interval (every eight pixels) in the example shown in FIG. 7).

FIGS. 8A to 8C are plan views showing another pixel array example of the color imaging element 47 (the phase-difference-pixel arrangement region 49), in which FIG. 8A is an overall view that is configured such that an A-plane and a B-plane are overlaid, FIG. 8B shows the A-plane, and FIG. 8C shows the B-plane. The color imaging element 47 shown in FIG. 8 has a so-called honeycomb array structure in which pixels are adjacently arranged so as to be inclined at 45 degrees in the horizontal direction and the vertical direction. As shown in FIGS. 8B and 8C, each of the A-plane and the B-plane has the above described Bayer array configuration in the horizontal direction and the vertical direction. Reference characters "RA", "GA" and "BA" are assigned to color filters of the A-plane corresponding to RGB, and reference characters "RB", "GB" and "BB" are assigned to color filters of the B-plane corresponding to RGB. In the example, on the A-plane, the first phase difference pixel 61 is arranged "every three pixels (at three pixel intervals) in each of the horizontal direction and the vertical direction", and on the B-plane, the second phase difference pixel 62 is arranged "every three pixels (at three pixel intervals) in each of the horizontal direction and the vertical direction". As a whole, the first phase difference pixel 61 on the A-plane and the second phase difference pixel 62 on the B-plane are adjacent in a diagonal direction at 45 degrees relative to the horizontal direction and the vertical direction.

Here, the above described first phase difference pixel 61 and second phase difference pixel 62 may be arranged as same-color pixels (G pixels in the example shown in FIG. 5 and FIG. 7), or may be arranged as different-color pixels (RGB pixels in the example shown in FIGS. 8A to 8C). In the case of being arranged as same-color pixels (G pixels), it is possible to deal with the output signals from the first phase difference pixel 61 and the second phase difference pixel 62 as luminance signals, and to compose the split image described later as a monochrome image. On the other hand, in the case of being arranged as different-color pixels (RGB pixels), it is possible to compose the split image described later as a color image by performing a pixel data interpolation process for the output signals from the first phase difference pixel 61 and the second phase difference pixel 62.

Further, in the above described example, the normal pixel 60 not having the light-shielding member 66 and the phase difference pixel (the first phase difference pixel 61, the second phase difference pixel 62) having the light-shielding member 66 are present in a mixed manner, but all pixels of the color imaging element 47 may be phase difference pixels (the first phase difference pixel 61, the second phase difference pixel 62). For example, in the example shown in FIG. 8, all pixels on the A-plane (see FIG. 8B) may be constituted by the first phase difference pixel 61, and all pixels on the B-plane (see FIG. 8C) may be constituted by the second phase difference pixel 62. Then, all pixels of the color imaging element 47 may be configured by the combination of these A-plane and B-plane. In this case, the split image described later is generated based on output values of the first phase difference pixel 61 and the second phase difference pixel 62, similarly to embodiments described below. On the other hand, the normal image (normal image data) may be generated based on the output value of any one of the first phase difference pixel 61 and the second phase difference pixel 62, or may be generated based on the output values of both of the first phase difference pixel 61 and the second phase difference pixel 62. Further, in the manual focus mode, only the split image may be displayed on the EVF 28/rear LCD 30, while the normal image is not displayed on the EVF 28/rear LCD 30. In this case, a synthesis processing unit (see FIG. 10) described later does not perform the synthesis of the normal image data and the split image data, and only the split image data is sent to the display unit (the EVF 28, the rear LCD 30) at a subsequent stage.

In the automatic focus mode, the digital camera 10 having such a configuration performs a so-called "phase difference AF" control in which the output signal (image data) of the first phase difference pixel 61 and the output signal (image data) of the second phase difference pixel 62 are compared and the focus adjustment amount (referred to also as the defocus amount) of the photographing optical system 40 is determined. Here, the automatic focus technique is not limited to the phase difference AF control, and a so-called "contrast AF" control may be appropriately adopted.

On the other hand, in the manual focus mode, the split image is created, and a user can exactly perform the focusing manually by checking the split image to be displayed on the display unit (the EVF 28, the rear LCD 30).

In the following, the creation method and display method for the split image are described in detail.

Figure 9:
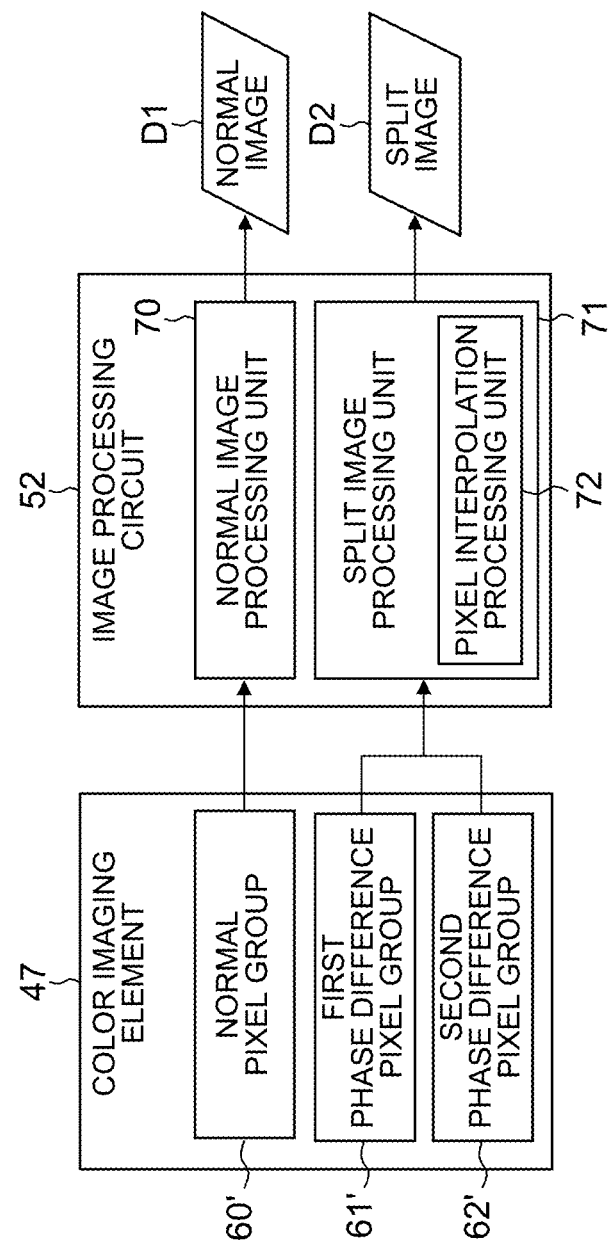
FIG. 9 is a block diagram showing a functional configuration of the color imaging element and an image processing circuit, and mainly shows a functional configuration involved in the creation of a split image.
Figure 10:
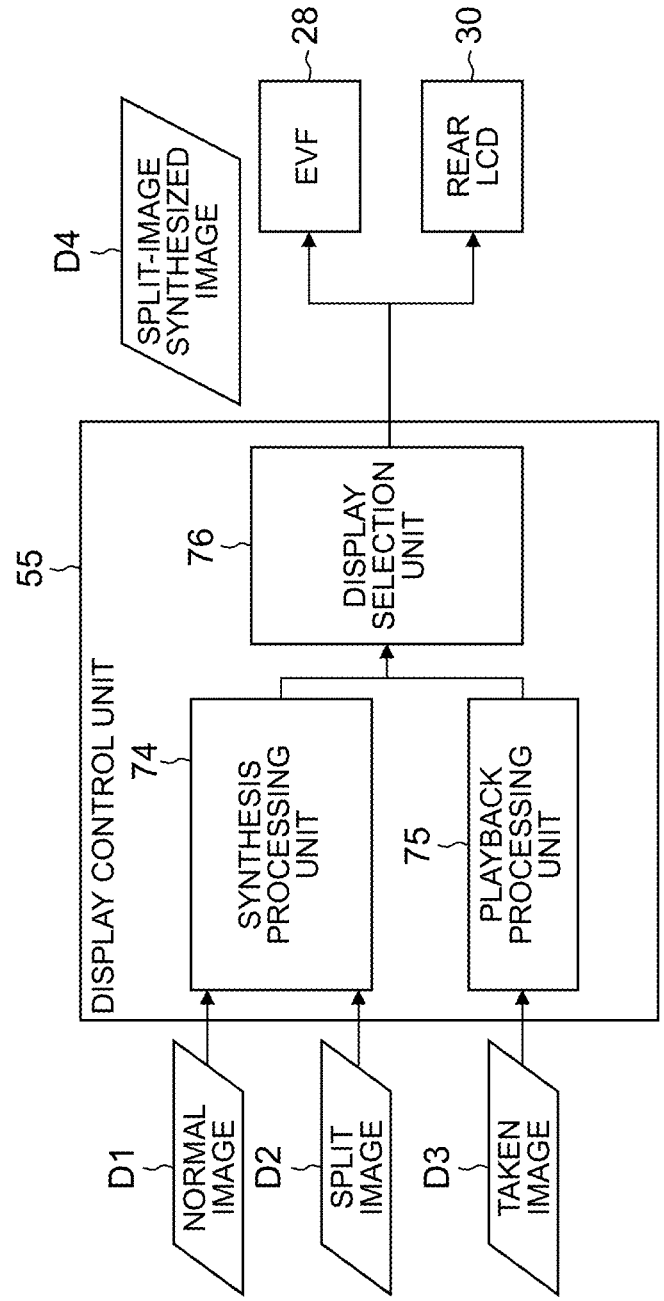
FIG. 10 is a block diagram showing a functional configuration of a display control unit, and mainly shows a functional configuration involved in the synthesis and output of the split image.

FIG. 9 is a block diagram showing a functional configuration of the color imaging element 47 and the image processing circuit 52, and mainly shows a functional configuration involved in the creation of the split image. FIG. 10 is a block diagram showing a functional configuration of the display control unit 55, and mainly shows a functional configuration involved in the synthesis and output of the split image.

As described above, the color imaging element 47 includes the normal pixels 60 arranged in the normal pixel region 48 and the phase-difference-pixel arrangement region 49, and the phase difference pixels (the first phase difference pixels 61, the second phase difference pixels 62) arranged in the phase-difference-pixel arrangement region 49. A normal pixel group 60' constituted by the normal pixels 60 of the pixels constituting the color imaging element 47 is used for the generation of the normal image. On the other hand, a first phase difference pixel group 61' constituted by the first phase difference pixels 61 and a second phase difference pixel group 62' constituted by the second phase difference pixels 62 are used for the generation of the split image.

That is, the image signals (image data; third image signal) that are of the image signals to be output from the color imaging element 47 and that are output from the normal pixel group 60' are sent to a normal image processing unit 70 of the image processing circuit 52. The normal image processing unit 70 performs various image processes based on the image signals from the normal pixel group 60', and thereby, generates and outputs normal image data D1 (first display image).

On the other hand, the image signals output from the first phase difference pixel group 61' and the second phase difference pixel group 62' are sent to a split image processing unit 71 of the image processing circuit 52. The split image processing unit 71 performs various image processes for the image signals from the first phase difference pixel group 61' and the second phase difference pixel group 62', and thereby, generates and outputs split image data D2 (second display image). In the example, the generation of the normal image data D1 in the normal image processing unit 70 and the generation of the split image data D2 in the split image processing unit 71 are performed such that the normal image and the split image are different in at least any one of the decimation ratio, the enlargement ratio and the reduction ratio.

Here, the decimation process at the time of the generation of the normal image data D1 and the split image data D2 can be performed by an arbitrary technique. For example, when the image data (pixel data) is read from the color imaging element 47, the pixel data may be read from only the pixels necessary to achieve an intended decimation ratio. Further, an intended decimation ratio may be achieved by a process in which the image data (pixel data) is read from all pixels of the color imaging element 47 to be stored in the memory or the like, and then only intended pixel data is extracted (decimated) from the image data stored in the memory or the like.

The split image processing unit 71 includes a pixel interpolation processing unit 72 to perform the pixel data interpolation process of the input image (split image). The pixel interpolation processing unit 72, as necessary, performs the pixel data interpolation process of the image data from the first phase difference pixel group 61' and the second phase difference pixel group 62'. As the pixel data interpolation process in the pixel interpolation processing unit 72, an arbitrary interpolation process can be appropriately adopted.

The normal image data D1 and split image data D2 created in this way are sent to a synthesis processing unit 74 of the display control unit 55, through the VRAM region of the memory 56 and the like. At the time of the manual focus mode, the synthesis processing unit 74 generates a live-view image (split-image synthesized image) to be displayed on the display unit (the EVF 28, the rear LCD 30). That is, the synthesis processing unit 74 creates synthesized image data (split-image synthesized image) D4 of the normal image and the split image, based on the received normal image data D1 and the split image data D2. The split-image synthesized image data D4 created in this way is sent to the display unit (the EVF 28, the rear LCD 30) that is a display target decided in a display selection unit 76 of the display control unit 55. The display unit (the EVF 28, the rear LCD 30) displays, as a live-view image, an image that is based on the sent split-image synthesized image data D4, and this live-view image is used for the focus check at the time of the manual focus.

The "decision of the display target of the split-image synthesized image" in the display selection unit 76 can be performed by an arbitrary technique. For example, the camera body 12 may be provided with a sensor to detect whether a user looks into the EVF 28, and a detection signal from the sensor may be input to the display selection unit 76. In this case, when the sensor detects that a user looks into the EVF 28, the split-image synthesized image data D4 may be output to the EVF 28, and when not detecting that a user looks into the EVF 28, the split-image synthesized image data D4 may be output to the rear LCD 30. Further, the digital camera 10 (the camera body 12, the lens unit 14) may be provided with a switch or the like for switching the display unit on which the split-image synthesized image (live-view image) is displayed, and a switching signal from the switch or the like may be input to the display selection unit 76. In this case, based on this switching signal, the split-image synthesized image data D4 may be output to the EVF 28 and/or the rear LCD 30. Further, the display selection unit 76 may output the split-image synthesized image data D4 to any one of the EVF 28 and the rear LCD 30, or may output the split-image synthesized image data D4 to the two.

Here, the display control unit 55 includes a playback processing unit 75 to receive taken image data D3, in addition to the synthesis processing unit 74 and the display selection unit 76. The playback processing unit 75 generates an image to be played back and displayed on the display unit (the EVF 28, the rear LCD 30) in the image playback mode, from the taken image data D3 stored in the memory card 57 or the memory 56. The playback processing unit 75 performs an image process to generate image data in a format that allows for the display on the EVF 28 and/or the rear LCD 30. For example, it performs a decompression process for the compressed taken image data D3 with the compression/decompression processing circuit 54, and performs a development process for the taken image data D3 in a RAW format. Then, the image data generated in the playback processing unit 75 is output to the display unit (the EVF 28, the rear LCD 30) that is decided in the display selection unit 76.

In the above example, an example in which the display control unit 55 synthesizes the normal image data D1 and split image data D2 created in the image processing circuit 52 has been described. However, the normal image data D1 and the split image data D2 may be synthesized in the image processing circuit 52. FIG. 11 is a block diagram showing a modification of the image processing circuit 52. In the modification, the image processing circuit 52 includes a synthesis processing unit 74, in addition to the normal image processing unit 70 and the split image processing unit 71. This synthesis processing unit 74 synthesizes the normal image data D1 from the normal image processing unit 70 and the split image data D2 from the split image processing unit 71, to create the split-image synthesized image data D4. In this case, the display control unit 55 does not need to include the synthesis processing unit 74, and the split-image synthesized image (the split-image synthesized image data D4) created in the synthesis processing unit 74 (the image processing circuit 52) is output to a display target (the EVF 28 and/or the rear LCD 30) that is decided in the display selection unit 76 of the display control unit 55.

Next, the normal image and split image to be displayed on the display unit (the EVF 28, the rear LCD 30) are described.

Figure 12B:
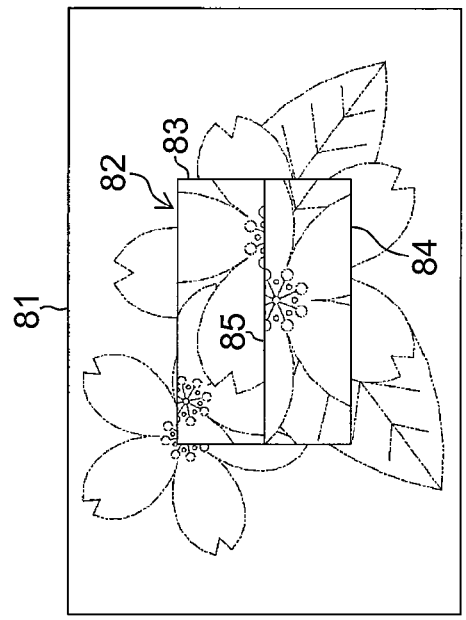
FIGS. 12A and 12B are diagrams showing an example of a normal image and split image (split-image synthesized image) to be displayed on a display unit (an EVF, a rear LCD), in FIG. 12A shows an in-focus state
Figure 12A:
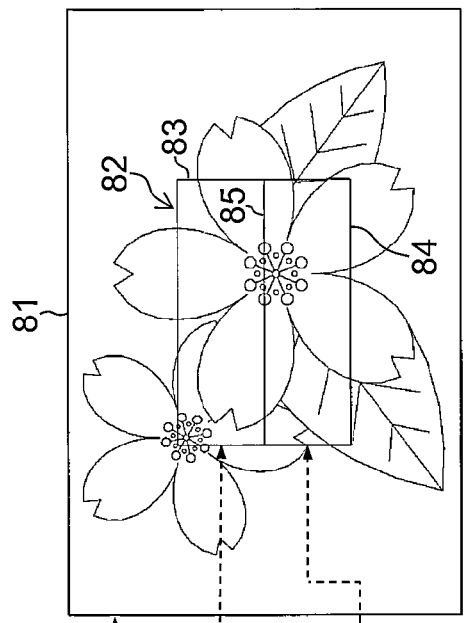

FIGS. 12A and 12B are diagrams showing an example of the normal image and split image (split-image synthesized image) to be displayed on the display unit (the EVF 28, the rear LCD 30), in which FIG. 12A shows an in-focus state and FIG. 12B shows an out-of-focus state.

The split image processing unit 71 (see FIG. 9) of the image processing circuit 52 generates split image data D2-L (first split image 83) when the upper half region of the central region of an object with respect to FIG. 12 is viewed from the L-viewpoint side, based on the output signals from the first phase difference pixel group 61'. Further, the split image processing unit 71 generates split image data D2-R (second split image 84) when the lower half region of the central region of the object with respect to the figure is viewed from the R-viewpoint side, based on the output signals from the second phase difference pixel group 62'. The first split image 83 and the second split image 84 are adjacently arranged such that a division line 85 extending in the horizontal direction is the border, and thereby, a split image 82 (the split image data D2) is composed.

The first split image 83 and the second split image 84 shift in the left-right direction (horizontal direction (first direction)) with respect to FIG. 12, depending on the focus state of the focus lens 42 (see FIG. 2). The shift amount between the first split image 83 and the second split image 84 corresponds to the shift amount of the focus of the focus lens 42. That is, the left-right direction with respect to FIG. 12 is a phase difference direction corresponding to the shift direction between the respective object optical images formed on an imaging surface 47a of the color imaging element 47 by the photographing optical system 40. Therefore, when the focus lens 42 is in focus, for the first split image 83 and the second split image 84, the shift amount becomes zero (including nearly zero) (see FIG. 12A).

On the other hand, the shift amount between the first split image 83 and the second split image 84 increases as the focus of the focus lens 42 shifts (see FIG. 12B). Thereby, a user can perform the focus adjustment by performing the rotating operation of the focus ring 26 while checking the shift amount of the split image 82 (the first split image 83, the second split image 84) in the live-view image on the display unit.

FIG. 13 is a flowchart showing a photographing process flow at the time of the manual focus mode.

When the photographing mode is selected through the mode switching button 34 (see FIG. 1B) (step S1 in FIG. 13) and the manual focus mode is selected through the focus mode switching lever 18 (see in FIG. 1A) (S2), the CPU 50 (see FIG. 2) controls the operation of the mechanical shutter 43 through the lens driver 46, and therewith, drives the color imaging element 47 through the imaging element driver 51 (S3). Here, the operation of the digital camera 10 when the AF mode is set is known, and therefore, the specific description is omitted herein.

When the manual focus mode is set (S2), the output signals from the normal pixels 60 (the normal pixel group 60') of the color imaging element 47 are input to the normal image processing unit 70 of the image processing circuit 52 (S4). The normal image processing unit 70 generates the normal image data D1 based on the output signals from the normal pixels 60 (S5), and stores it in the VRAM region of the memory 56.

On the other hand, the output signals from the first phase difference pixels 61 and the second phase difference pixels 62 are input to the split image processing unit 71 (S6), and the pixel interpolation processing unit 72 of the split image processing unit 71 performs the interpolation process of the pixel data (S7). The split image processing unit 71 generates the first split image 83 based on the output signals (and interpolation pixel data) from the first phase difference pixels 61 (the first phase difference pixel group 61'), and generates the second split image 84 based on the output signals (and interpolation pixel data) from the second phase difference pixels 62 (the second phase difference pixel group 62'). Thereby, the split image 82 (the split image data D2) containing the first split image 83 and the second split image 84 is generated (S8). The split image data D2 is stored in the VRAM region of the memory 56.

The display control unit 55 reads the normal image data D1 and the split image data D2 from the memory 56, synthesizes the normal image data D1 and the split image data D2, and thereafter, outputs the synthesized image data (the split-image synthesized image data D4) to the display unit (the EVF 28, the rear LCD 30). Thereby, as shown in FIG. 12, a live-view image in which the split image 82 based on the split image data D2 is contained within the normal image 81 based on the normal image data D1 is displayed on the display unit (the EVF 28, the rear LCD 30) (S9).

Since the first split image 83 and the second split image 84 shift in the left-right direction with respect to FIG. 12 depending on the focus state of the focus lens 42, a user moves the focus lens 42 along the optical axis direction by performing the rotating operation of the focus ring 26. The shift amount between the first split image 83 and the second split image 84 decreases gradually as the focus lens 42 comes close to an in-focus position where it is in focus on an object. Thereby, the user can perform the focus adjustment while checking the live-view image on the display unit.

When the focus lens 42 is set to the in-focus position, the shift amount between the first split image 83 and the second split image 84 becomes zero (see FIG. 12A). Thereby, the focus lens 42 becomes in focus on an object, and the focus adjustment is completed (S10). Thereafter, the above processes (S3 to S10) are repeatedly executed until the shutter button 20 is pushed down.

When the shutter button 20 is pushed down, the normal image data D1 equivalent to one frame is generated in the normal image processing unit 70, and is temporarily stored in the VRAM region of the memory 56. The normal image data D1 is compressed in the compression/decompression processing circuit 54, and thereafter, is recorded in the memory card 57 through the medium interface 53 (S11). Thereafter, the above processes (S3 to S11) are repeatedly executed until the manual focus mode is finished.

In the manual focus mode utilizing the above described split image, each embodiment described below harmonizes the display of the split image among a plurality of a display device (the EVF 28, the operation unit 32 and the like), and thereby, the usability for a user is improved. When the display unit on which the split image is displayed is switched in a camera including a plurality of display units, it is necessary to be different in the technique for reading the pixel data from the imaging element, and the image display process. Hence, in the image generation device (the image processing circuit 52, the display control unit 55) according to each embodiment described below, the EVF 28 (first display device) and the rear LCD 30 (second display device) are different in at least any one of the pixels (phase difference pixels) that are used in the generation of the split image, the enlargement ratio and reduction ratio of the split image, and the pixel region in which the split image is displayed.

The "resolutions (the numbers of display pixels)" of the EVF 28 and the rear LCD 30 and the "display ratio of the normal image 81 and the split image 82" can be previously known through the CPU 50 of the camera body 12. Therefore, at the time of the generation of the normal image data D1 and split image data D2 in the normal image processing unit 70 and split image processing unit 71, or at the time of the generation of the split-image synthesized image data D4 in the synthesis processing unit 74, a variety of image data can be created in data formats optimized to the display regions of the EVF 28 and the rear LCD 30.

For example, in the EVF 28, when the normal image 81 and the split image 82 are displayed in an image display region of 800 pixels×600 pixels and the split image 82 is displayed in a range of 400 pixels×300 pixels of them, it is possible to generate the normal image data D1 of "800 pixels×600 pixels" and the split image data D2 of "400 pixels×300 pixels" in the normal image processing unit 70 and the split image processing unit 71, or to synthesize and generate the normal image 81 and split image 82 having intended pixel numbers, at the time of the synthesis processing in the synthesis processing unit 74.

Further, at the time of the creation of the normal image data D1 and the split image data D2 (live-view image) in the normal image processing unit 70 and the split image processing unit 71, the image processing circuit 52 may acquire the data of all pixels (the normal pixels, the phase difference pixels) of the color imaging element 47, or may acquire only the data of the pixels necessary for the creation of the normal image data D1 and the split image data D2. By acquiring only the data of the pixels necessary for the creation of the normal image data D1 and the split image data D2, it is possible to reduce the load of the acquisition process (reading process) of the pixel data and the arithmetic process at the time of the data creation, and to increase the processing speed.

In the following, each of embodiments relevant to the specific technique for displaying the split image on a plurality of display devices is described.

Here, in each embodiment described below, the EVF 28 and the rear LCD 30 are assumed as the plurality of display devices, but the display device is not limited to these. For example, the plurality of display devices may include an external EVF to be mounted on a hot shoe 24.

Further, in each embodiment described below, the adjustment of the decimation ratio of the pixels to be used in the generation of the split image, the enlargement ratio of the split image, or the reduction ratio of the split image is performed, under the control by the CPU 50, by the drive control of the color imaging element 47 by the imaging element driver 51, the image processing control in the image processing circuit 52 and the display control unit 55, or the like. For example, it is possible to adjust the decimation ratio of the pixels to be used in the generation of the split image, by controlling the pixel data to be sent from the color imaging element 47 to the image processing circuit 52 by the imaging element driver 51, controlling the split image data D2 to be created in the image processing circuit 52 (the split image processing unit 71), or controlling the split-image synthesized image data D4 to be created in the synthesis processing unit 74. Further, it is possible to adjust the enlargement ratio or reduction ratio of the split image, by performing an appropriate enlargement process or reduction process for the image data in each processing unit, at the time of the creation of the split image data D2 in the image processing circuit 52 (the split image processing unit 71), or at the time of the split-image synthesized image data D4 in the synthesis processing unit 74.

Further, in each embodiment described below, the frame rate of the split-image synthesized image (the normal image 81, the split image 82) to be displayed on the display unit (the EVF 28, the rear LCD 30) is adjusted by the control of the display control unit 55 by the CPU 50.

Further, in each embodiment described below, as for the normal image 81 (the normal image data D1) to be displayed on the display unit (the EVF 28 and the rear LCD 30) in the manual focus mode, the image processing circuit 52 (the normal image processing unit 70) performs an image reduction process corresponding to the number of the constituent pixels of the display unit, for the pixel data (image data) from the normal pixel group 60', such that the whole of the image picked up and acquired by the color imaging element 47 is displayed on the display unit.

First Embodiment

First, an embodiment in which the display of the split image in the manual focus mode is switched between the two display units (the EVF 28, the rear LCD 30) such that both display units are not different in the display magnification of the split image and a user does not have an uncomfortable feeling is described.

The image generation device (the image processing circuit 52, the display control unit 55) according to the embodiment generates the split image by performing at least any one of the decimation process, the enlargement process and the reduction process, and matches the split image to be displayed on the EVF 28 and the split image to be displayed on the rear LCD 30 in at least any one of the decimation ratio of the pixels that are of the phase difference group (the first phase difference pixel group 61' and the second phase difference pixel group 62') and that are used in the generation of the split image, the enlargement ratio of the split image, and the reduction ratio of the split image.

Generally, the resolution of the display unit is 640 pixels× 480 pixels (VGA), 800 pixels×600 pixels (SVGA), 1024 pixels×768 pixels (XGA), 1280 pixels×1024 pixels (SXGA), or the like. In the embodiment, a case where the display region of the EVF 28 has a pixel number of 800 pixels×600 pixels (SVGA) and the display region of the rear LCD 30 has a pixel number of 640 pixels×480 pixels (VGA) is described.

Figure 14:
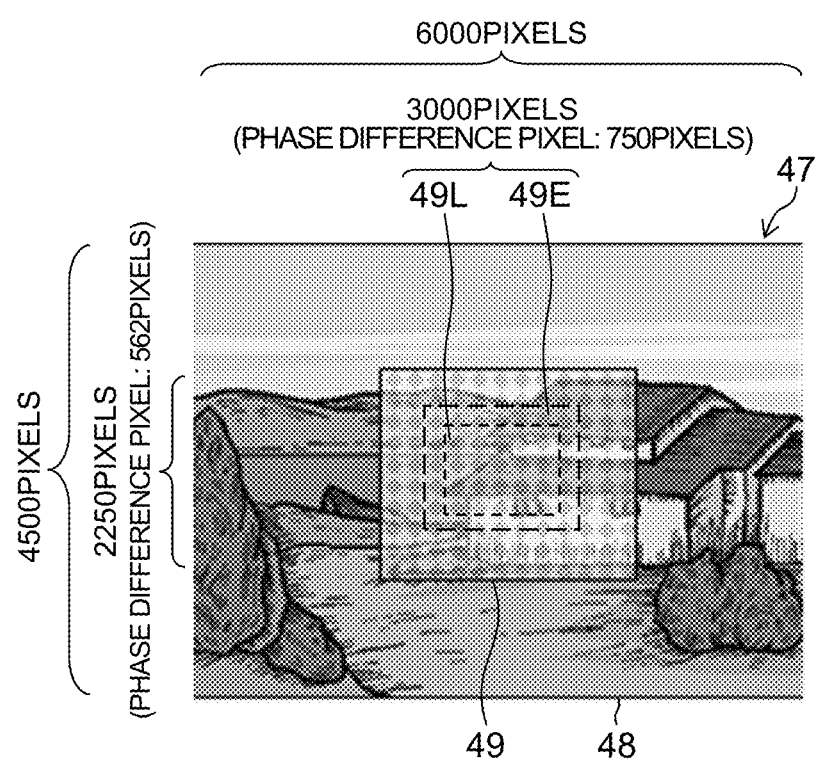
FIG. 14 is a schematic diagram showing a range of phase difference pixels to be used in the generation of the split image, in a first embodiment.
Figure 15A:
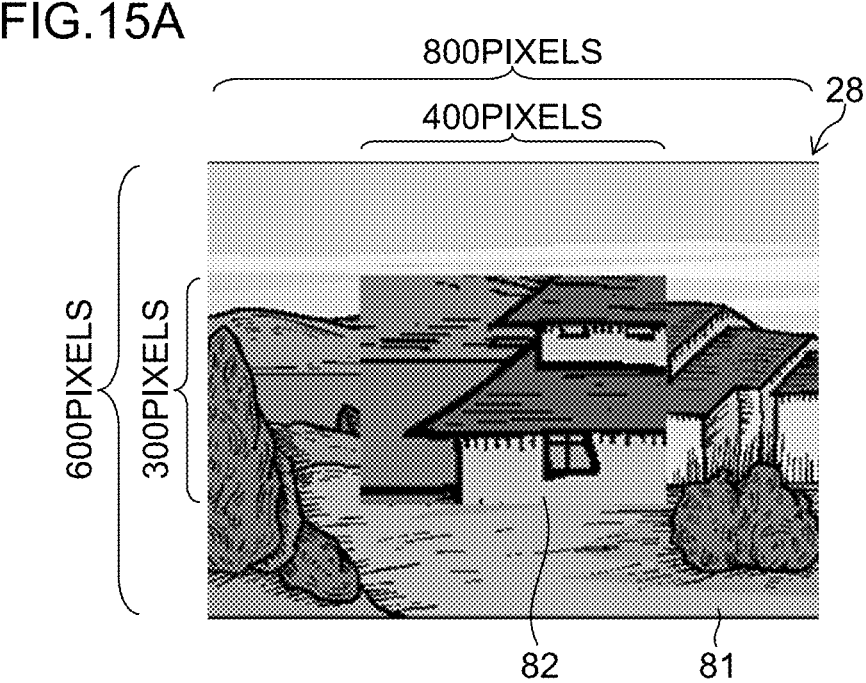
Figure 15B:
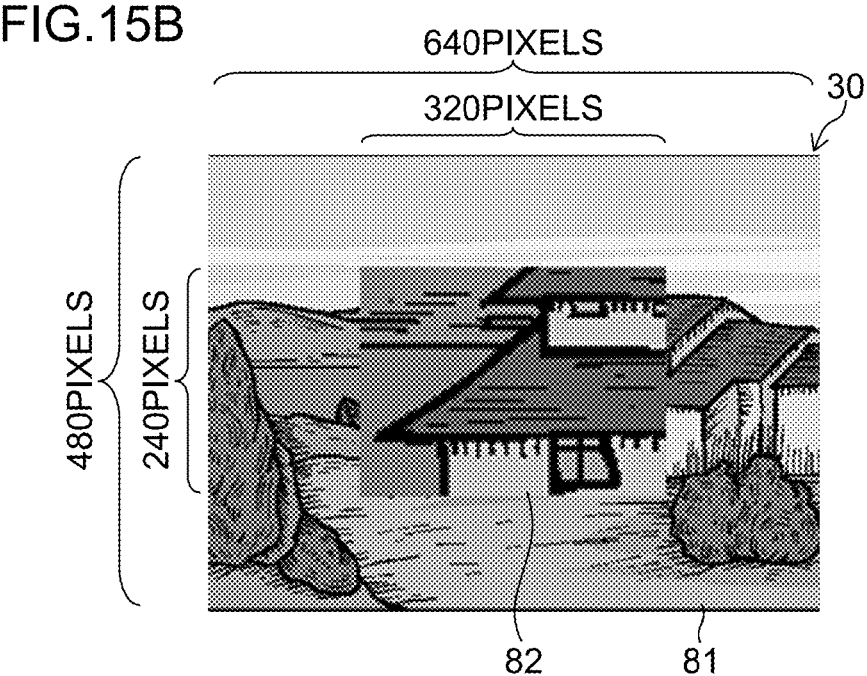

FIG. 14 is a schematic diagram of the color imaging element that shows a range of phase difference pixels to be used in the generation of the split image, in the first embodiment. FIGS. 15A and 15B show display units to display the normal image and the split image in the first embodiment, in which FIG. 15A shows an image display example on the EVF and FIG. 15B shows an image display example on the rear LCD.

The image generation device (the image processing circuit 52, the display control unit 55) according to the embodiment makes the split image to be displayed on the EVF 28 and the split image to be displayed on the rear LCD 30 different in the pixels that are of the phase difference pixel group (the first phase difference pixel group 61' and the second phase difference pixel group 62') and that are used in the generation of the split image. More specifically, the image generation device (the image processing circuit 52, the display control unit 55) makes the split image to be displayed on the EVF 28 and the split image to be displayed on the rear LCD 30 different in the pixel range on the color imaging element 47 that is of the phase difference pixel group (the first phase difference pixel group 61' and the second phase difference pixel group 62') and that is used in the generation of the split image.

In the example shown in FIG. 14, in the pixel range of the color imaging element 47 to be used in the generation of the split image, a range 49E of the phase difference pixels that are used for the split image to be displayed on the EVF 28 is a part of the whole range of the phase-difference-pixel arrangement region 49. Further, a range 49L of the phase difference pixels that are used for the split image to be displayed on the rear LCD 30 is a part of the whole range of the "range 49E of the phase difference pixels that are used for the split image to be displayed on the EVF 28". That is, in the color imaging element 47, a use pixel range 49E for the split image on the EVF 28 is larger than a use pixel range 49L for the split image on the rear LCD 30, and the use pixels (phase difference pixels) for the split image on the rear LCD 30 overlap with some of the use pixels for the split image on the EVF 28.

For example, in the color imaging element 47 having a display region of 6000 pixels×4500 pixels, if the pixels (phase difference pixels) for the split image are arranged every four pixels in an area of 50% around the center, 750 pixels×562 pixels are contained as the phase difference pixel for the split image.

On the other hand, as shown in FIG. 15A, in the EVF 28 having a pixel number of 800 pixels×600 pixels (SVGA), when the split image 82 is displayed, for example, in a portion of 50% (25% as the pixel number ratio) around the center of the angular field range, the number of the pixels constituting the split image display region of the EVF 28 is 400 pixels×300 pixels.

In order to display the split image 82 in the split image display region of 400 pixels×300 pixels of the EVF 28 at the 100% same-magnification, a range that is a partial range of the phase-difference-pixel arrangement region 49 of the color imaging element 47 and that contains phase difference pixels of 400 pixels×300 pixels is set as the "range 49E of the phase difference pixels that are used for the split image to be displayed on the EVF 28". In this case, as for the image display of the EVF 28, the split image 82 is displayed so as to be enlarged relative to the surrounding normal image 81, but it is sometimes preferable to display the split image 82 on the display unit at the 100% same-magnification, from the standpoint of an accurate focusing at the time of the manual focus. Further, the enlarged display of the split image 82 leads to a merit that a user can easily grasp the focus state and the check is facilitated.

On the other hand, as shown in FIG. 15B, in the rear LCD 30 having a pixel number of 640 pixels×480 pixels (VGA), when the split image is displayed, for example, in a portion of 50% (25% as the pixel number ratio) around the center of the angular field range, the number of the pixels constituting the split image display region of the rear LCD 30 is 320 pixels× 240 pixels.

In order to display the split image 82 in the split image display region of 320 pixels×240 pixels of the rear LCD 30 at the 100% same-magnification, a range that is a partial range of the "range 49E of the phase difference pixels that are used for the split image to be displayed on the EVF 28" of the phase-difference-pixel arrangement region 49 of the color imaging element 47 and that contains phase difference pixels of 320 pixels×240 pixels is set as the "range 49L of the phase difference pixels that are used for the split image to be displayed on the rear LCD 30". In this case, as for the image display of the rear LCD 30, an image in which the split image 82 is enlarged relative to the surrounding normal image 81 is obtained, and an image having a narrower range than the case of the EVF 28 (FIG. 15A) is displayed on the rear LCD 30, as the split image 82.

Displaying the split image 82 at the 100% same-magnification herein means displaying the split image 82 to be created from only the pixel data of phase difference pixels that are adjacent to each other on the color imaging element 47, without performing the interpolation of the pixel data and the decimation of the pixel data from the phase difference pixels. Therefore, in order to achieve the "100% same-magnification display" of the split image 82, the image generation device (the image processing circuit 52, the display control unit 55), in the generation of the split image 82, uses all phase difference pixels contained in the pixel range (49E, 49L) on the color imaging element 47 that is of the phase difference pixel group (the first phase difference pixel group 61' and the second phase difference pixel group 62') and that is used in the generation of the split image 82.

When the display of the split image 82 is different for each display device, the display manner of the split image 82 at the time of the focusing is different among display devices, and therefore, a user needs to decide the focus state based on the shift degree of the split image 82 (the first split image 83, the second split image 84), by a separate criterion for each display device.

Therefore, in a camera including a plurality of display devices (the EVF 28, the rear LCD 30) having different resolutions, in the case of switching the display unit on which the split-image synthesized image (the normal image 81, the split image 82) is displayed, it is possible to display the split image 82 on all display units at a common magnification (the 100% same-magnification display in the example shown in FIG. 15), by varying, for each display unit, the region (range) of the phase difference pixels that are used for the split image 82 as shown in FIG. 14. Thereby, it is possible to relieve the uncomfortable feeling in the focusing operation at the time of the switching of the display unit on which the split image 82 is displayed.

Here, the positions, sizes and others of the "range 49E of the phase difference pixels that are used for the split image to be displayed on the EVF 28" and the "range 49L of the phase difference pixels that are used for the split image to be displayed on the rear LCD 30" on the color imaging element 47 are not particularly limited. However, a user often performs the focusing at the center portion of the taken image, and therefore, it is preferable to determine these ranges 49E, 49L on the basis of the center portion of the color imaging element 47 (array pixels).

Modification 1-1

In the above described example, the image generation device (the image processing circuit 52, the display control unit 55) matches the split image to be displayed on the EVF 28 and the split image to be displayed on the rear LCD 30 in the decimation ratio of the pixels (phase difference pixels) that are of the phase difference pixel group (the first phase difference pixel group 61' and the second phase difference pixel group 62') and that are used in the generation of the split image 82. That is, in the example shown in FIG. 14 and FIG. 15, using all phase difference pixels contained in the ranges 49E, 49L of the phase difference pixels that are used for the split images 82, the split image 82 is displayed on the EVF 28 and the rear LCD 30 at the 100% same-magnification.

However, in order that the two display units (the EVF 28, the rear LCD 30) are not different in the display magnification of the split image 82, it is not always necessary to generate the split image 82 using all phase difference pixels contained in the ranges 49E, 49L of the phase difference pixels that are used for the split image 82. For example, also in the case where the split image 82 is generated from phase difference pixels that are of the phase difference pixel ranges 49E, 49L to be used for the split image 82 and that are decimated at a fixed ratio (an identical ratio), the two display units (the EVF 28, the rear LCD 30) can be the same in the display magnification of the split image 82.

Further, in the case of the enlarged display or reduced display of the split image 82 on the EVF 28 and the rear LCD 30, the two display units (the EVF 28, the rear LCD 30) can be the same in the display magnification of the split image 82, by matching the split image 82 to be displayed on the EVF 28 and the split image 82 to be displayed on the rear LCD 30 in the enlargement ratio/reduction ratio of the split image 82 based on the output values of phase difference pixels that are in the phase difference pixel ranges 49E, 49L to be used in the generation of the split image 82 and that are actually used in the generation of the split image 82.

Modification 1-2

In the example shown in FIG. 15, on each of the EVF 28 and the rear LCD 30, the split image 82 is displayed in the portion of 50% around the center of the angular field range, but the display regions of the split images 82 on the EVF 28 and the rear LCD 30 are not particularly limited. Therefore, for example, the ratio of the display region for the split image 82 to the whole display region may be greater than 50%, or may be less than 50%. Further, the display region for the split image 82 may be a spot other than the center of the angular field range.

Further, the EVF 28 and the rear LCD 30 may be different in the ratio of the display region for the split image 82 to the whole display region. Therefore, the image generation device (the image processing circuit 52, the display control unit 55) may generate the split image 82 to be displayed on the EVF 28 and the split image 82 to be displayed on the rear LCD 30 such that the relative size of the display region for the split image 82 to the whole display region of the EVF 28 is different from the relative size of the display region for the split image 82 to the whole display region of the rear LCD 30.

Further, the image generation device (the image processing circuit 52, the display control unit 55) may generate the split image 82 for the EVF 28 and the split image 82 for the rear LCD 30 such that the relative size of the display region for the split image 82 to the whole display region of the EVF 28 is the same as the relative size of the display region for the split image 82 to the whole display region of the rear LCD 30.

Further, for example, the number of the pixels constituting the split image display region of the EVF 28 and the number of the pixels constituting the split image display region of the rear LCD 30 may be matched or may be similar, and the split image 82 having the same angular field range (for example, 400 pixels×300 pixels) may be displayed on both of the EVF 28 and the rear LCD 30. In this case, the phase difference pixels that are used in the generation of the split image 82 to be displayed on the EVF 28 and the phase difference pixels that are used in the generation of the split image 82 to be displayed on the rear LCD 30 are matched, but the EVF 28 and the rear LCD 30 are different in the relative size of the split image display region to the whole display region. Therefore, the image generation device (the image processing circuit 52, the display control unit 55) generates the split image 82 to be displayed on the EVF 28 and the split image 82 to be displayed on the rear LCD 30 such that the relative size of the display region for the split image 82 to the whole display region of the EVF 28 is different from the relative size of the display region for the split image 82 to the whole display region of the rear LCD 30 and the angular field range of the split image 82 to be displayed on the EVF 28 and the angular field range of the split image 82 to be displayed on the rear LCD 30 are the same.

Modification 1-3

The display units (the EVF 28, the rear LCD 30) may be different in the frame rate of the live-view image (split-image synthesized image) at the time of the manual focus mode. In this case, the frame rate of the split-image synthesized image to be displayed on the rear LCD 30 may be higher than the frame rate of the split-image synthesized image to be displayed on the EVF 28.

The resolution of the rear LCD 30 is lower than the resolution of the EVF 28, and the rear LCD 30 is less than the EVF 28 in the number of the constituent pixels of the display region for the split-image synthesized image. Therefore, the pixel data necessary for the sprit-image synthesized image to be displayed on the rear LCD 30 requires less data amount than the pixel data necessary for the sprit-image synthesized image to be displayed on the EVF 28. Therefore, by reading only the pixel data necessary for the generation of the split-image synthesized image from the color imaging element 47 at the time of the generation of the live-view image in the manual focus mode, it is possible to reduce the "read pixel region in the color imaging element 47" necessary for the generation of the split-image synthesized image to be displayed on the rear LCD 30, relative to the case of the EVF 28, and to increase the frame rate of the split-image synthesized image to be displayed on the rear LCD 30, relative to the EVF 28.

Modification 1-4

In the above described example, an example in which the phase difference pixels on the color imaging element 47 that are used in the generation of at least any one of the split image 82 to be displayed on the EVF 28 and the split image 82 to be displayed on the rear LCD 30 are some of the phase difference pixels constituting the phase difference pixel group (the first phase difference pixel group 61' and the second phase difference pixel group 62') has been shown. However, the phase difference pixels on the color imaging element 47 that are used in the generation of at least any one of the split image 82 to be displayed on the EVF 28 and the split image 82 to be displayed on the rear LCD 30 may be all of the pixels constituting the phase difference pixel group (the first phase difference pixel group 61' and the second phase difference pixel group 62').

For example, using all phase difference pixels constituting the phase difference pixel group (the first phase difference pixel group 61' and the second phase difference pixel group 62') in the phase-difference-pixel arrangement region 49 of the color imaging element 47, the split image 82 to be displayed in the split image display region of 320 pixels×240 pixels of the rear LCD 30 may be generated, or the split image 82 to be displayed in the split image display region of 400 pixels×300 pixels of the EVF 28 may be generated. By generating the split image 82 using all phase difference pixels constituting the phase difference pixel group (the first phase difference pixel group 61' and the second phase difference pixel group 62') of the color imaging element 47 in this way, it is possible to generate an accurate split image 82.

In this case, it is preferable to match the number of all pixels constituting the split image display region of the EVF 28 or the rear LCD 30 and the number of all phase difference pixels constituting the phase difference pixel group (the first phase difference pixel group 61' and the second phase difference pixel group 62') contained in the phase-difference-pixel arrangement region 49 of the color imaging element 47. In this case, it is possible to display the split image 82 at the 100% same-magnification, in the split image display region of the EVF 28 or the rear LCD 30.

Modification 1-5

On at least one of the EVF 28 and the rear LCD 30, consecutively connected images in which there is no image unevenness between the normal image 81 and split image 82 to be displayed at the time of the focusing may be displayed. That is, as shown in FIG. 12A, in the state of being in focus, a series of images may be formed by the normal image 81 and split image 82 to be displayed on the display unit. When the normal image 81 and the split image 82 are the same in the display enlargement ratio or the decimation ratio of the constituent pixels, the normal image 81 and split image 82 to be displayed on the display unit are consecutively connected. For example, when the "pixel interval on the color imaging element 47 for adjacent pixels constituting the normal image 81" and the "pixel interval on the color imaging element 47 for adjacent pixels constituting the split image 82" are the same and the "pixel interval on the color imaging element 47 for adjacent pixels on the display unit across the border line between the normal image 81 and the split image 82" is the same as the "pixel interval on the color imaging element 47 for adjacent pixels constituting the normal image 81 and the split image 82", it is possible to form a series of images by the normal image 81 and split image 82 to be displayed on the display unit.

Therefore, the image generation device (the image processing circuit 52, the display control unit 55) may make the normal image 81 and the split image 82 the same in a parameter that is of parameters including the decimation ratio, enlargement ratio and reduction ratio of the normal image 81 and split image 82 to be displayed on at least one of the EVF 28 and the rear LCD 30 and that is associated with the process to be performed in the generation of the normal image 81 and the split image 82.

Second Embodiment

Next, an embodiment in which one display unit of the two display units has priority is described. In the embodiment, the split image is displayed at the 100% same-magnification on the EVF 28, and the split image to be displayed on the rear LCD 30 is generated so as to have the same angular field range as the split image to be displayed at the 100% same-magnification on the EVF 28.

In the embodiment, identical reference characters are assigned to configurations identical or similar to the above described first embodiment, and the detail description is omitted.

Figure 16A:
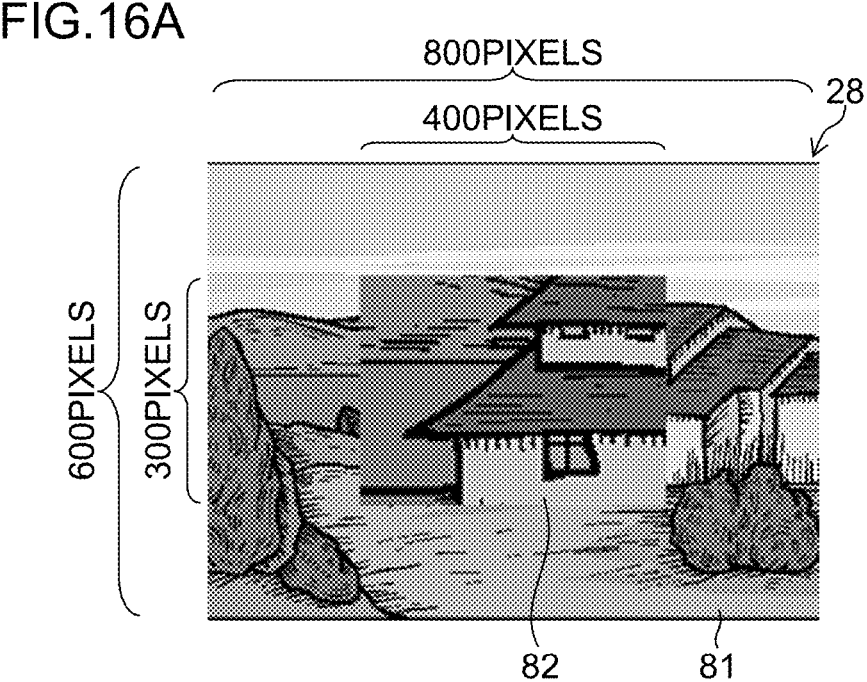
Figure 16B:
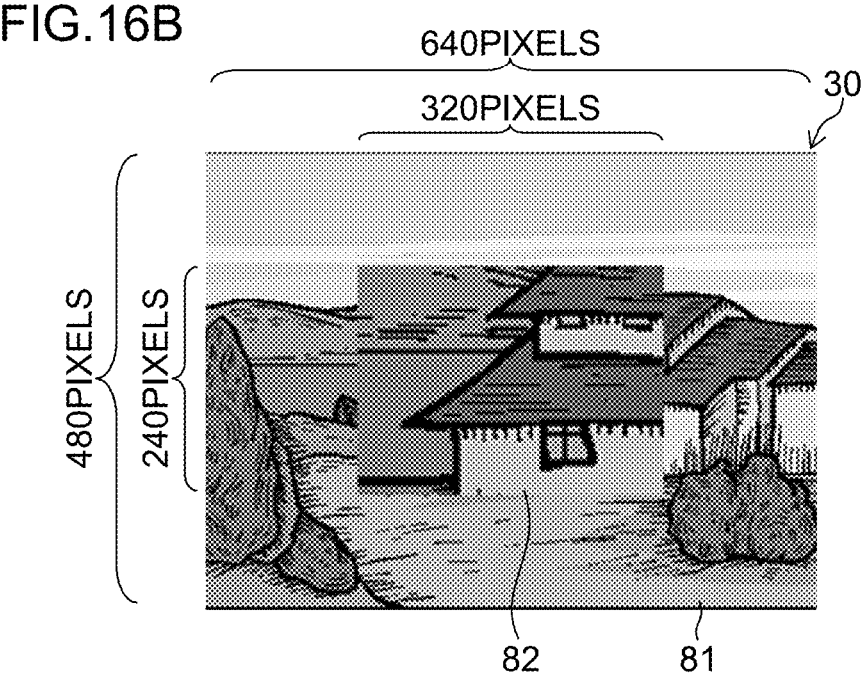

FIGS. 16A and 16B shows display units to display the normal image 81 and the split image 82 in a second embodiment, in which FIG. 16A shows an image display example on the EVF 28 and FIG. 16B shows an image display example on the rear LCD 30.

An image generation device (the image processing circuit 52, the display control unit 55) according to the embodiment makes the EVF 28 and the rear LCD 30 different in the scaling ratio (the enlargement ratio, the reduction ratio) of the split image 82, such that the angular field range of the split image 82 to be displayed on the EVF 28 and the angular field range of the split image 82 to be displayed on the rear LCD 30 are the same.

Since the split image 82 is displayed at the 100% same-magnification on the EVF 28, the number of the pixels constituting the display region for the split image 82 of the EVF 28 and the pixel number of the phase difference pixels that are of the phase difference pixel group (the first phase difference pixel group 61' and the second phase difference pixel group 62') of the color imaging element 47 and that contribute to the generation of the split image 82 to be displayed on the EVF 28 are the same.

In the embodiment, similarly to the above described first embodiment, the color imaging element 47 is constituted by 6000 pixels×4500 pixels (including the normal pixel and the phase difference pixel), the pixels (phase difference pixels) for the split image are arranged every four pixels in an area of 50% around the center of the pixel region, and the color imaging element 47 contains phase difference pixels of 750 pixels×562 pixels (see FIG. 14). Meanwhile, as shown in FIG. 16, the display region of the EVF 28 has a pixel number of 800 pixels×600 pixels (SVGA), the display region of the rear LCD 30 has a pixel number of 640 pixels×480 pixels (VGA), and the split image 82 is displayed in a portion of 50% around the center of the angular field range, on each of the EVF 28 and the rear LCD 30. Therefore, the number of the pixels constituting the split image display region of the EVF 28 is 400 pixels×300 pixels, and the number of the pixels constituting the split image display region of the rear LCD 30 is 320 pixels×240 pixels.

On the EVF 28, the split image 82 is displayed at the 100% same-magnification in the split image display region of 400 pixels×300 pixels, and the "range 49E of the phase difference pixels that are used for the split image to be displayed on the EVF 28" is in common with the above described first embodiment.

On the other hand, the split image 82 to be displayed in the split image display region that is constituted by 320 pixels×

240 pixels of the rear LCD 30 is generated by performing a 80% image reduction process for the image data of the phase difference pixels contained in the "range 49E of the phase difference pixels that are used for the split image to be displayed on the EVF 28".

In the embodiment, the split image 82 to be displayed on the rear LCD 30 is controlled such that the split image 82 having the same angular field range is displayed on both of the EVF 28 and the rear LCD 30. The split image display region of the rear LCD 30 is constituted by a pixel number of 80% relative to the display region of the EVF 28 with respect to each of the horizontal direction and the vertical direction. Therefore, the 80% reduction process with respect to each of the horizontal direction and the vertical direction is performed for the split image 82 to be displayed on the EVF 28, and thereby, the number of the pixels constituting the split image 82 after the reduction process matches the number of the pixels in the split image display region of the rear LCD 30, and the split image 82 having the same angular field range can be displayed on both of the EVF 28 and the rear LCD 30.

The image reduction process herein is not particularly limited, and a known technique (a pixel decimation process or the like) can be appropriately used.

Modification 2-1

In the above described example, the split image display of the EVF 28 is given priority over the split image display of the rear LCD 30, and while the split image 82 is displayed at the 100% same-magnification on the EVF 28, the split image 82 to be displayed on the rear LCD 30 is obtained by the image reduction process. However, the split image display of the rear LCD 30 may be given priority over the split image display of the EVF 28.

That is, the split image 82 may be displayed at the 100% same magnification on the rear LCD 30, and the number of the pixels constituting the display region for the split image 82 on the rear LCD 30 and the pixel number of the phase difference pixels that are of the phase difference pixel group (the first phase difference pixel group 61' and the second phase difference pixel group 62') of the color imaging element 47 and that contribute to the generation of the split image 82 to be displayed on the rear LCD 30 may be the same.

For example, when the split image 82 is displayed at the 100% same-magnification on the rear LCD 30 similarly to the above described first embodiment, the split image 82 to be displayed on the EVF 28 may be acquired by an image enlargement process. That is, on the rear LCD 30, the split image 82 is displayed at the 100% same-magnification in the split image display region of 320 pixels×240 pixels, and the "range 49L of the phase difference pixels that are used for the split image to be displayed on the rear LCD 30" is in common with the above described first embodiment.

On the other hand, the split image 82 to be displayed in the split image display region that is constituted by 400 pixels× 300 pixels of the EVF 28 is generated by performing a 125% image enlargement process for the image data of the phase difference pixels contained in the "range 49L of the phase difference pixels that are used for the split image to be displayed on the rear LCD 30". The split image display region of the EVF 28 is constituted by the number of constituent pixels of 125% relative to the display region of the rear LCD 30 with respect to each of the horizontal direction and the vertical direction. Therefore, the 125% image enlargement process with respect to each of the horizontal direction and the vertical direction is performed for the split image 82 to be displayed on the rear LCD 30, and thereby, the number of the pixels constituting the split image 82 after the enlargement process matches the number of the pixels in the split image display region of the EVF 28, and the split image 82 having the same angular field range is displayed on both of the EVF 28 and the rear LCD 30.

The image enlargement process herein is not particularly limited, and a known technique (a pixel interpolation process or the like) can be appropriately used.

Modification 2-2

In the above described examples, the split image 82 is displayed at the 100% same-magnification on the EVF 28 (or the rear LCD 30). However, as long as the split image 82 having the same angular field range can be displayed on both of the EVF 28 and the rear LCD 30, it is not always necessary to display the split image 82 at the 100% same-magnification.

For example, also in the case where, for the split image 82 to be displayed on one of the EVF 28 and the rear LCD 30, the split image 82 is generated from the phase difference pixels that are of the phase difference pixel range (49E, 49L) to be used in the generation of the split image 82 and that are decimated at a fixed ratio, the split image 82 to be displayed on the other of the EVF 28 and the rear LCD 30 can be generated by an image enlargement process or an image reduction process, such that the split images 82 having the same angular field range between the two display units (the EVF 28, the rear LCD 30) are displayed.

Further, in the case where the split image 82 to be displayed on one of the EVF 28 and the rear LCD 30 is generated by an image enlargement process or an image reduction process, it is only necessary to create a split image having the same angular field range as the split image after the enlargement or the reduction, by various image processes (an enlargement process, a reduction process and the like), depending on the number of the constituent pixels of the split image display region of the other of the EVF 28 and the rear LCD 30.

Modification 2-3

In the above described example shown in FIG. 16, on both of the EVF 28 and the rear LCD 30, the split image 82 is displayed in the portion of 50% around the center of the angular field range. However, the display regions for the split images 82 on the EVF 28 and the rear LCD 30 are not particularly limited. Therefore, for example, the ratio of the display region for the split image 82 to the whole display region may be greater than 50%, or may be less than 50%. Further, the display region for the split image 82 may be a spot other than the center of the angular field range. Further, the EVF 28 and the rear LCD 30 may be different in the ratio of the display region for the split image 82 to the whole display region.

Also in these cases, the split image processing unit 71 performs various image processes (an enlargement process, a reduction process) for the split image data D2, such that the angular field ranges of the split images 82 to be displayed on the EVF 28 and the rear LCD 30 are the same.

Further, the image generation device (the image processing circuit 52, the display control unit 55) may generate the split image 82 to be displayed on the EVF 28 and the split image 82 to be displayed on the rear LCD 30 such that the relative size of the display region for the split image 82 to the whole display region of the EVF 28 is different from the relative size of the display region for the split image 82 to the whole display region of the rear LCD 30.

Further, the image generation device (the image processing circuit 52, the display control unit 55) may generate the split image 82 for the EVF 28 and the split image 82 for the rear LCD 30 such that the relative size of the display region for the split image 82 to the whole display region of the EVF 28 is the same as the relative size of the display region for the split image 82 to the whole display region of the rear LCD 30.

Further, for example, the number of the pixels constituting the split image display region of the EVF 28 and the number of the pixels constituting the split image display region of the rear LCD 30 may be matched or may be similar, and the split image 82 having the same angular field range (for example, 400 pixels×300 pixels) may be displayed on both of the EVF 28 and the rear LCD 30. Therefore, the image generation device (the image processing circuit 52, the display control unit 55) generates the split image 82 to be displayed on the EVF 28 and the split image 82 to be displayed on the rear LCD 30 such that the relative size of the display region for the split image 82 to the whole display region of the EVF 28 is different from the relative size of the display region for the split image 82 to the whole display region of the rear LCD 30 and the angular field range of the split image 82 to be displayed on the EVF 28 and the angular field range of the split image 82 to be displayed on the rear LCD 30 are the same.

Modification 2-4

When the reduction process of the split image 82 is actualized by a pixel decimation process, the pixel number of the color imaging element 47 necessary for the generation of the split image 82 after the reduction process is less than the pixel number of the color imaging element 47 necessary for the generation of the split image 82 before the reduction process.

Therefore, in the case of reading and acquiring pixel data from only the pixels of the color imaging element 47 necessary for the generation of the split image 82 when the split image processing unit 71 generates the split image 82, the generation of the split image 82 to be displayed on the rear LCD 30 requires less amount of the reading and acquiring of the pixel data than the generation of the split image 82 to be displayed on the EVF 28, and therefore, it is possible to speed up the reading and acquiring of the pixel data. Therefore, the frame rate of the split-image synthesized image (the normal image 81, the split image 82) on the rear LCD 30 easily becomes higher than the frame rate of the split-image synthesized image on the EVF 28.

Modification 2-5

The above described embodiments have shown examples in which the phase difference pixels on the color imaging element 47 that are used in the generation of at least any one of the split image 82 to be displayed on the EVF 28 and the split image 82 to be displayed on the rear LCD 30 are some of the phase difference pixels constituting the phase difference pixel group (the first phase difference pixel group 61' and the second phase difference pixel group 62'). However, the phase difference pixels on the color imaging element 47 that are used in the generation of at least any one of the split image 82 to be displayed on the EVF 28 and the split image 82 to be displayed on the rear LCD 30 may be all pixels constituting the phase difference pixel group (the first phase difference pixel group 61' and the second phase difference pixel group 62').

In this case, it is preferable to match the number of all pixels constituting the split image display region of the EVF 28 or the rear LCD 30 and the number of all phase difference pixels constituting the phase difference pixel group (the first phase difference pixel group 61' and the second phase difference pixel group 62') contained in the phase-difference-pixel arrangement region 49 of the color imaging element 47. In this case, it is possible to display the split image 82 at the 100% same-magnification in the split image display region of the EVF 28 or the rear LCD 30.

Modification 2-6

On at least one of the EVF 28 and the rear LCD 30, consecutively connected images in which there is no image unevenness between the normal image 81 and split image 82 to be displayed at the time of the focusing may be displayed. That is, as shown in FIG. 12A, in the state of being in focus, a series of images may be formed by the normal image 81 and split image 82 to be displayed on the display unit. When the normal image 81 and the split image 82 are the same in the display scaling ratio and the decimation ratio of the constituent pixels, the normal image 81 and split image 82 to be displayed on the display unit are consecutively connected. Further, when the "pixel interval on the color imaging element 47 for adjacent pixels constituting the normal image 81" and the "pixel interval on the color imaging element 47 for adjacent pixels constituting the split image 82" are the same and the "pixel interval on the color imaging element 47 for adjacent pixels on the display unit across the border line between the normal image 81 and the split image 82" is the same as the "pixel interval on the color imaging element 47 for adjacent pixels constituting the normal image 81 and the split image 82", it is possible to form a series of images by the normal image 81 and split image 82 to be displayed on the display unit.

Therefore, the image generation device (the image processing circuit 52, the display control unit 55) may make the normal image 81 and the split image 82 the same in a parameter that is of parameters including the decimation ratio, enlargement ratio and reduction ratio of the normal image 81 and split image 82 to be displayed on at least one of the EVF 28 and the rear LCD 30 and that is associated with the process to be performed in the generation of the normal image 81 and the split image 82.

So far, the preferable embodiments of the present invention have been described. The present invention is not limited to the above described embodiments, and can be appropriately applied to other modes.

For example, in the above embodiments, the digital camera has been described, but the configuration of the image processing device and the imaging device is not limited to this. For example, the present invention can be applied to a built-in or external PC camera, a portable terminal device (a mobile phone, a smart phone, a PDA (Personal Digital Assistants), a portable game machine or the like) having a photographing function, or the like.

Further, the present invention can be applied to a program (software) that makes a computer execute each processing step described above and a non-transitory computer-readable medium in which the program is recorded.

What is claimed is:

1. An image processing device comprising:
an image generation device configured to generate a first display image based on an image signal and generating a second display image from a first image and a second image, the image signal being output from an imaging element, the imaging element including a first pixel group and a second pixel group on which an object image passing through a first region and a second region of a photographing lens is pupil-divided and formed, respectively, the second display image being used for focus check, the first image and the second image being based on a first image signal and a second image signal that are output from the first pixel group and the second pixel group;

a first display device and a second display device configured to display the first display image and the second display image; and a display control device configured to perform such a control that the first display image generated by the image generation device is displayed on at least one of the first display device and the second display device and that the second display image generated by the image generation device is displayed within a display region for the first display image, wherein the image generation device generates the first display image and the second display image such that the first display image and the second display image are different in at least any one of decimation ratio, enlargement ratio and reduction ratio of the first display image and the second display image, and the image generation device makes the first display device and the second display device different in at least any one of pixels that are of the first pixel group and the second pixel group and that are used in the generation of the second display image, the enlargement ratio and the reduction ratio of the second display image, and a pixel region in which the second display image is displayed.

2. The image processing device according to claim 1, wherein the number of pixels in a display region of the first display device is greater than the number of pixels in a display region of the second display device.

3. The image processing device according to claim 1, wherein the image generation device generates the second display image by performing at least any one of a decimation process, an enlargement process and a reduction process, and matches the second display image to be displayed on the first display device and the second display image to be displayed on the second display device, in at least any one of the decimation ratio of the pixels that are of the first pixel group and the second pixel group and that are used in the generation of the second display image, the enlargement ratio of the second display image, and the reduction ratio of the second display image.

4. The image processing device according to claim 1, wherein the image generation device makes the second display image to be displayed on the first display device and the second display image to be displayed on the second display device different in the pixels that are of the first pixel group and the second pixel group and that are used in the generation of the second display image.

5. The image processing device according to claim 1, wherein the image generation device makes the second display image to be displayed on the first display device and the second display image to be displayed on the second display device different in a pixel range on the imaging element that is of the first pixel group and the second pixel group and that is used in the generation of the second display image.

6. The image processing device according to claim 1, wherein in the generation of the second display image, the image generation device uses all of the pixels contained in a pixel range on the imaging element that is of the first pixel group and the second pixel group and that is used in the generation of the second display image.

7. The image processing device according to claim 1, wherein pixels on the imaging element that are used in the generation of at least any one of the second display image to be displayed on the first display device and the second display image to be displayed on the second display device are all of the pixels that constitute the first pixel group and the second pixel group.

8. The image processing device according to claim 1, wherein pixels on the imaging element that are used in the generation of at least any one of the second display image to be displayed on the first display device and the second display image to be displayed on the second display device are some of the pixels that constitute the first pixel group and the second pixel group.

9. The image processing device according to claim 1, wherein the image generation device makes the first display device and the second display device different in the enlargement ratio and the reduction ratio of the second display image, such that an angular field range of the second display image to be displayed on the first display device and an angular field range of the second display image to be displayed on the second display device are the same.

10. The image processing device according to claim 9, wherein the number of pixels that constitute a display region for the second display image on the first display device, and the number of pixels that are of the first pixel group and the second pixel group and that contribute to the generation of the second display image to be displayed on the first display device are the same.

11. The image processing device according to claim 9, wherein the number of pixels that constitute a display region for the second display image on the second display device, and the number of pixels that are of the first pixel group and the second pixel group and that contribute to the generation of the second display image to be displayed on the second display device are the same.

12. The image processing device according to claim 1, wherein the image generation device generates the second display image to be displayed on the first display device and the second display image to be displayed on the second display device, such that a relative size of a display region for the second display image to the whole display region of the first display device is different from a relative size of a display region for the second display image to the whole display region of the second display device and an angular field range of the second display image to be displayed on the first display device and an angular field range of the second display image to be displayed on the second display device are the same.

13. The image processing device according to claim 1, wherein the image generation device generates the second display image to be displayed on the first display device and the second display image to be displayed on the second display device, such that a relative size of a display region for the second display image to the whole display region of the first display device is different from a relative size of a display region for the second display image to the whole display region of the second display device.

14. The image processing device according to claim 1, wherein the image generation device generates the second display image to be displayed on the first display device and the second display image to be displayed on the second display device, such that a relative size of a display region for the second display image to the whole display region of the first display device is the same as a relative size of a display region for the second display image to the whole display region of the second display device.

15. The image processing device according to claim 1, wherein the imaging element further includes a third pixel group that outputs a third image signal, the third pixel group being a pixel group on which the object image is formed without pupil division, and the image generation device generates the first display image based on the third image signal.

16. The image processing device according to claim 1, wherein in at least one of the first display device and the second display device, the first display image and the second display image are the same in a parameter that is of parameters including the decimation ratio, the enlargement ratio and the reduction ratio of the first display image and the second display image and that is associated with a process to be performed when the image generation device generates the first display image and the second display image.

17. An imaging device comprising:

an imaging element including a first pixel group and a second pixel group on which an object image passing through a first region and a second region of a photographing lens is pupil-divided and formed, respectively, and the image processing device according to claim 1.

18. An image processing method comprising:

a step of generating a first display image based on an image signal and generating a second display image from a first image and a second image, the image signal being output from an imaging element, the imaging element including a first pixel group and a second pixel group on which an object image passing through a first region and a second region of a photographing lens is pupil-divided and formed, respectively, the second display image being used for focus check, the first image and the second image being based on a first image signal and a second image signal that are output from the first pixel group and the second pixel group; and a step of displaying the first display image on at least one of the first display device and the second display device and displaying the second display image within a display region for the first display image, wherein the first display image and the second display image are generated such that the first display image and the second display image are different in at least any one of decimation ratio, enlargement ratio and reduction ratio of the first display image and the second display image, and the first display device and the second display device are different in at least any one of pixels that are of the first pixel group and the second pixel group and that are used in the generation of the second display image, the enlargement ratio and the reduction ratio of the second display image, and a pixel region in which the second display image is displayed.

19. A non-transitory computer-readable medium having a program causing a computer to execute:

a step of generating a first display image based on an image signal and generating a second display image from a first image and a second image, the image signal being output from an imaging element, the imaging element including a first pixel group and a second pixel group on which an object image passing through a first region and a second region of a photographing lens is pupil-divided and formed, respectively, the second display image being used for focus check, the first image and the second image being based on a first image signal and a second image signal that are output from the first pixel group and the second pixel group; and a step of displaying the first display image on at least one of the first display device and the second display device and displaying the second display image within a display region for the first display image, wherein the first display image and the second display image are generated such that the first display image and the second display image are different in at least any one of decimation ratio, enlargement ratio and reduction ratio of the first display image and the second display image, and the first display device and the second display device are different in at least any one of pixels that are of the first pixel group and the second pixel group and that are used in the generation of the second display image, the enlargement ratio and the reduction ratio of the second display image, and a pixel region in which the second display image is displayed.

* * * * *